US009372476B2

(12) United States Patent  
Nakata et al.

(10) Patent No.: US 9,372,476 B2  
(45) Date of Patent: Jun. 21, 2016

(54) SYSTEM CONSTRUCTION SUPPORTING APPARATUS AND SYSTEM CONFIGURATION DIAGRAM CREATING METHOD

(75) Inventors: Hiroyuki Nakata, Chiyoda-ku (JP); Masayuki Ueno, Chiyoda-ku (JP); Hiroyuki Nakamura, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 407 days.

(21) Appl. No.: 14/116,820

(22) PCT Filed: Feb. 27, 2012

(86) PCT No.: PCT/JP2012/054741  
§ 371 (c)(1), (2), (4) Date: Nov. 11, 2013

(87) PCT Pub. No.: WO2013/014961  
PCT Pub. Date: Jan. 31, 2013

(65) Prior Publication Data  
US 2014/0081431 A1 Mar. 20, 2014

(30) Foreign Application Priority Data  
Jul. 25, 2011 (WO) .................. PCT/JP2011/066870

(51) Int. Cl.  
*G05B 15/02* (2006.01)  
*G05B 19/042* (2006.01)

(52) U.S. Cl.  
CPC ............ *G05B 15/02* (2013.01); *G05B 19/0426* (2013.01); *G05B 2219/23258* (2013.01); *G05B 2219/25067* (2013.01); *G05B 2219/25071* (2013.01); *Y02P 90/265* (2015.11)

(58) Field of Classification Search  
CPC ............... G05B 15/02; G05B 19/0426; G05B 2219/23258; G05B 2219/25067; G05B 2219/25071; Y02P 90/265  
See application file for complete search history.

(56) References Cited

U.S. PATENT DOCUMENTS 4,764,867 A * 8/1988 Hess .................. G06F 17/30958  
                                                 707/E17.011  
5,475,400 A * 12/1995 Sellers ..................... G09G 5/39  
                                               345/602

(Continued)

FOREIGN PATENT DOCUMENTS

DE    102006059829 A1    6/2008  
JP        6-187396 A    7/1994

(Continued)

OTHER PUBLICATIONS

Communication dated Sep. 29, 2015, issued by the German Patent Office in counterpart German Application No. 112012003108.3.

(Continued)

*Primary Examiner* — Ramesh Patel  
(74) *Attorney, Agent, or Firm* — Sughrue Mion, PLLC; Richard C. Turner

(57) ABSTRACT

A system construction supporting apparatus searches through, when receiving an input for arranging a component on the system configuration diagram anew, association information in which combinations among components connectable to one another are described and extracts a component connectable to a component selected by the input, connects a display object of the selected component and a display object of the extracted component each other and arranges the display objects, and independently moves, when receiving an input for moving one of a plurality of display objects connected to one another and arranged on the system configuration diagram (Yes at step S53), the display object designated by the input while deforming a connection line connecting the display object designated by the input and another display object connected to the display object while maintaining a connection relation between the display objects by the connection line (steps S60 to S62).

11 Claims, 23 Drawing Sheets

(56) References Cited

U.S. PATENT DOCUMENTS

| | | | | |
|---|---|---|---|---|
| 5,481,716 | A | * | 1/1996 | Morshedi .................. G06F 9/44 700/82 |
| 5,579,442 | A | * | 11/1996 | Kimoto .................... B25J 9/161 318/568.11 |
| 5,787,282 | A | * | 7/1998 | Tanaka ...................... G06F 8/00 700/86 |
| 5,983,210 | A | * | 11/1999 | Imasaki ................... G06N 3/08 706/15 |
| 6,618,856 | B2 | * | 9/2003 | Coburn ............ G05B 19/41885 700/86 |
| 7,062,422 | B2 | * | 6/2006 | Inoko ..................... G05B 19/05 700/2 |
| 2002/0040286 | A1 | * | 4/2002 | Inoko ..................... G05B 19/05 703/13 |
| 2006/0206217 | A1 | * | 9/2006 | Fujii ....................... G05B 19/05 700/18 |
| 2009/0237405 | A1 | * | 9/2009 | Hayashi .................. G06T 11/60 345/440 |

FOREIGN PATENT DOCUMENTS

| | | | |
|---|---|---|---|
| JP | 7-36684 | A | 2/1995 |
| JP | 7-160191 | A | 6/1995 |
| JP | 7-302350 | A | 11/1995 |
| JP | 11-39375 | A | 2/1999 |
| JP | 11-353490 | A | 12/1999 |
| JP | 2001-134573 | A | 5/2001 |
| JP | 2001-216142 | A | 8/2001 |
| JP | 2002-108421 | A | 4/2002 |
| JP | 2002-222300 | A | 8/2002 |
| JP | 2003-29973 | A | 1/2003 |
| JP | 2004-302636 | A | 10/2004 |
| JP | 2006-268834 | A | 10/2006 |
| JP | 2008-293080 | A | 12/2008 |
| JP | 2009-238215 | A | 10/2009 |
| JP | 2010-160582 | A | 7/2010 |

OTHER PUBLICATIONS

Communication dated Jul. 8, 2014 from the Japanese Patent Office in counterpart Japanese Patent Application No. 2013525597.

International Search Report for PCT/JP2012/054741 dated May 22, 2012.

Communication dated Feb. 22, 2016 from the State Intellectual Property Office of the P.R.C. issued in corresponding Application No. 201280035693.7.

* cited by examiner

| ROBOT CPU | ROBOT CONTROLLER | ROBOT MAIN BODY |
|---|---|---|
| Q172DRCPU | CR1QA-772 | RV-2SQ |
| Q172DRCPU | DU1A-772 | RV-2SQ |
| Q172DRCPU | CR1QA-721 | RV-3SQ |
| Q172DRCPU | DU1A-721 | RV-3SQ |
| Q172DRCPU | CR1QA-721 | RV-3SQC |
| Q172DRCPU | DU1A-721 | RV-3SQC |
| Q172DRCPU | CR1QA-731 | RV-3SQJ |
| Q172DRCPU | DU1A-731 | RV-3SQJ |
| Q172DRCPU | CR1QA-731 | RV-3SQJC |
| Q172DRCPU | DU1A-731 | RV-3SQJC |
| Q172DRCPU | CR2QA-711 | RV-6SQ |

SYSTEM CONSTRUCTION SUPPORTING APPARATUS AND SYSTEM CONFIGURATION DIAGRAM CREATING METHOD

CROSS REFERENCE TO RELATED APPLICATIONS

This application is a National Stage of International Application No. PCT/JP2012/054741 filed Feb. 27, 2012, claiming priority based on International Application No. PCT/JP2011/066870 filed Jul. 25, 2011, the contents of all of which are incorporated herein by reference in their entirety.

FIELD

The present invention relates to a system construction supporting apparatus and a system configuration diagram creating method for supporting construction of an FA system.

BACKGROUND

In an FA system, one or more programmable controllers (PLCs) functioning as control apparatuses for industrial machines are used. The PLC is configured by mounting a plurality of units on a base unit. As the units mounted on the base unit, a manufacturer provides, for example, a power supply unit configured to perform power supply to the PLC, a CPU unit configured to manage control of the entire PLC, a robot CPU unit configured to control, via a robot controller, a robot functioning as a controlled apparatus attached to a production apparatus or a facility apparatus, an input unit configured to receive signals of a switch and a sensor attached to appropriate places of the production apparatus or the facility apparatus, an output unit configured to output a control output to an actuator and the like, and a communication unit for connecting the PLC to a communication network. A user can combine desired units to construct the PLC.

In constructing the FA system, the user can use a system construction supporting apparatus. The system construction supporting apparatus can generate a system configuration diagram, which shows a connection relation among FA apparatuses (the PLC, the units included in the PLC, and the controlled apparatus connected to the units) included in the FA system, by arranging display objects corresponding to the FA apparatuses in designated positions on a screen and connecting the display objects to one another. Some system construction supporting apparatus can check consistency of specifications of the FA apparatuses and consistency among parameters respectively set for the FA apparatuses. Examples of the parameters include allocation ranges of an I/O memory to the respective units and network addresses for identifying respective PLCs connected to a network. Even before the user actually constructs the FA system, the user can create a system configuration diagram using the system construction supporting apparatus and provide the system configuration diagram for selection of the FA apparatus and examination of the entire configuration of the FA system.

For example, when the user selects a robot main body, the user has to select the robot main body out of a large number of prepared robot main bodies taking into account not only the number of axes and a weight capacity but also a connectable robot CPU unit and a connectable robot controller. Conversely, when the user selects a robot CPU unit and a robot controller, the user has to select the robot CPU unit and the robot controller taking into account, as an option, which robot main body the user desires to connect. In this way, the selection of the FA apparatuses is a large load for the user.

As measures against the problem, Patent Literature 1 discloses a technology for forcibly inserting an end unit into a base unit when a CPU unit is selected.

Patent Literature 2 discloses a program creation supporting apparatus that combines a component of a program on a flow diagram for program generation to generate the program. With the program creation supporting apparatus, it is possible to extract a list of components connectable to components selected on the flow diagram. When there is only one connectable component, the program creation supporting apparatus immediately arranges the connectable component on the flow diagram without the intervention of a user.

Patent Literature 3 discloses a grouping function for grouping a plurality of FA apparatuses and treating the FA apparatuses as one component.

CITATION LIST

Patent Literature

Patent Literature 1: Japanese Patent Application Laid-Open No. 2002-108421
Patent Literature 2: Japanese Patent Application Laid-Open No. 2001-216142
Patent Literature 3: Japanese Patent Application Laid-Open No. 2002-222300

SUMMARY

Technical Problem

However, when the technologies of Patent Literature 1 and Patent Literature 2 are applied to a system construction supporting apparatus, there is a problem in that, when the user desires to perform operation such as movement or deletion of an FA apparatus after the arrangement of the FA apparatus, the user cannot grasp FA apparatuses arranged simultaneously with the FA apparatus to be operated.

With the technology of Patent Literature 3, the user needs to manually select a plurality of components and group the components. Therefore, the user needs to check consistency of combinations concerning grouped component groups and, when there is inconsistency, release and rectify the grouping. Therefore, there is a problem in that the number of times of operation inputs due to rework is large and, as a result, a load on the user increases.

The present invention has been devised in view of the above and it is an object of the present invention to obtain a system construction supporting apparatus and a system configuration diagram creating method in which a load involved in creation of a system configuration diagram is reduced.

Solution to Problem

In order to solve the above problem and in order to attain the above object, in a system construction supporting apparatus that creates a system configuration diagram constructed by connecting a plurality of display objects corresponding to components of an FA system, the system construction supporting apparatus of the present invention includes: an association-information storing section configured to store in advance association information in which combinations among components connectable to one another are described; a component searching section configured to search through, when receiving a first input for designating a component and an arrangement position on the system configuration diagram and arranging a display object of the component anew on the system configuration diagram, the association information and extract another component connectable to the component; and a component arranging section configured to connect, with a connection line, the display object corresponding to the component and a display object of the extracted other component and arrange the display objects in designated arrangement position on the system configuration diagram. The component arranging section independently moves, when receiving a second input for moving one of a plurality of display objects connected to one another and arranged on the system configuration diagram, the display object designated by the second input while deforming the connection line connecting the display object designated by the second input and the connected other display object to maintain a connection relation between the designated display object and the other display object.

Advantageous Effects of Invention

In the system construction supporting apparatus according to the present invention, when a user simply performs an input for selecting one component and arranging the component on a system configuration diagram, other components, specifications of which match specifications of the selected component, are integrated with the selected component and arranged. The integrated plurality of components are simultaneously moved and deleted. Therefore, it is possible to reduce a load involved in creation of a system configuration diagram.

BRIEF DESCRIPTION OF DRAWINGS

FIG. 7-1 is a diagram of a data configuration example of system configuration setting information in the first embodiment.

FIG. 7-2 is a diagram of a data configuration example of the system configuration setting information in the first embodiment.

DESCRIPTION OF EMBODIMENTS

A system construction supporting apparatus and a system configuration diagram creating method of embodiments according to the present invention are explained in detail below based on the drawings. The present invention is not limited by the embodiments.

First Embodiment

Figure 1:
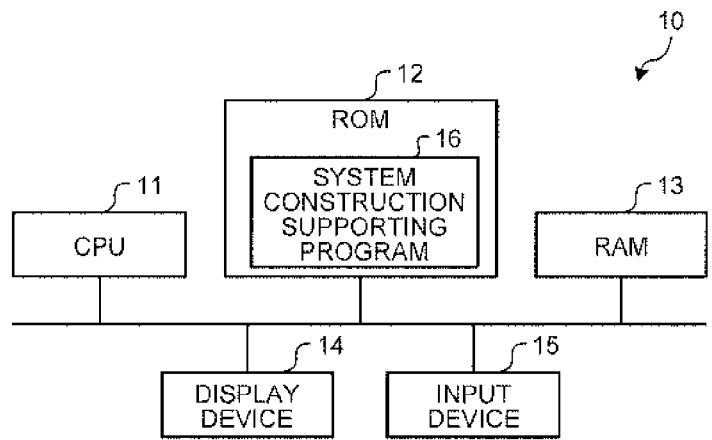
FIG. 1 is a diagram of a hardware configuration example of a system construction supporting apparatus in a first embodiment.

FIG. 1 is a diagram of a hardware configuration example of a system construction supporting apparatus 10 in a first embodiment. The system construction supporting apparatus 10 includes a CPU (Central Processing Unit) 11, a ROM (Read Only Memory) 12, a RAM (Random Access Memory) 13, a display device 14, and an input device 15. The CPU 11, the ROM 12, the RAM 13, the display device 14, and the input device 15 are connected to one another via a bus line.

The CPU 11 executes a system construction supporting program 16, which is a computer program for realizing functional configuration sections (explained below) of the system construction supporting apparatus 10. The display device 14 is, for example, a liquid crystal display or a CRT display and displays a screen generated by the CPU 11. The input device 15 includes a mouse and a keyboard. Operation of the system construction supporting apparatus 10 from a user is input to the input device 15. Operation information input to the input device 15 is sent to the CPU 11.

The system construction supporting program 16 is stored in the ROM 12 in advance. When loaded to the RAM 13 via the bus line, the system construction supporting program 16 generates program modules for realizing various functions in the RAM 13. The CPU 11 executes the program modules generated in the RAM 13 to thereby execute processing of the system construction supporting apparatus 10.

A storage medium in which the system construction supporting program 16 is stored in advance is not limited to only the ROM 12. The storage medium can be, for example, an external storage device or can be a CD-ROM or a detachable nonvolatile memory device. The system construction supporting program 16 can be stored on a computer connected to a network such as the Internet and provided or distributed by being downloaded through the network. The system construction supporting program 16 can be provided or distributed through a network such as the Internet. A loading destination of the system construction supporting program 16 is not limited to only the RAM 13. The system construction supporting program 16 can be loaded to, for example, an external storage device.

Figure 2:
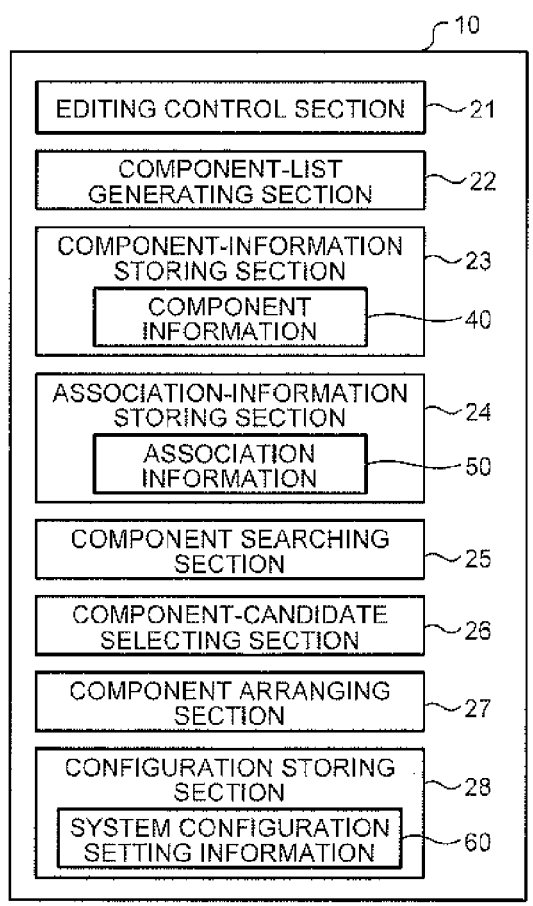
FIG. 2 is a diagram of the functional configuration of the system construction supporting apparatus in the first embodiment.

FIG. 2 is a diagram of the functional configuration of the system construction supporting apparatus 10 in the first embodiment. As shown in the figure, the system construction supporting apparatus 10 includes an editing control section 21 configured to display an editing screen for a system configuration diagram (a configuration diagram editing screen 31) on the display device 14 and receives an editing input for the system configuration diagram, a component-list generating section 22 configured to generate a list display screen for FA apparatuses (hereinafter referred to as components) (a component list display screen 32), a component-information storing section 23 configured to store component information 40 in which specifications of the components are described, an association-information storing section 24 configured to store association information 50 in which a correspondence relation between components, specifications of which match each other, (i.e., components connectable to each other) is described, a component searching section 25 configured to find a component from the association information stored in the association-information storing section 24, a component-candidate selecting section 26 configured to urge, when a search result of the association information is not uniquely determined, the user to perform an input for selecting a component to be integrated, a component arranging section 27 configured to integrate and arrange a found or selected plurality of components on a screen, and a configuration storing section 28 configured to store system configuration setting information 60 in which components included in the system configuration diagram formed on the configuration diagram editing screen 31 and a connection relation among the components are described.

The functions of the editing control section 21 the component-list generating section 22, the component arranging section 27, the component searching section 25, and the component-candidate selecting section 26 are realized when program modules corresponding thereto generated by expanding the system construction supporting program 16 in the RAM 13 are executed by the CPU 11. The component-information storing section 23, the association-information storing section 24, and the configuration storing section 28 are secured in, for example, the RAM 13 or the external storage device, for example, when the system construction supporting program 16 is loaded to the RAM 13.

Figure 3:
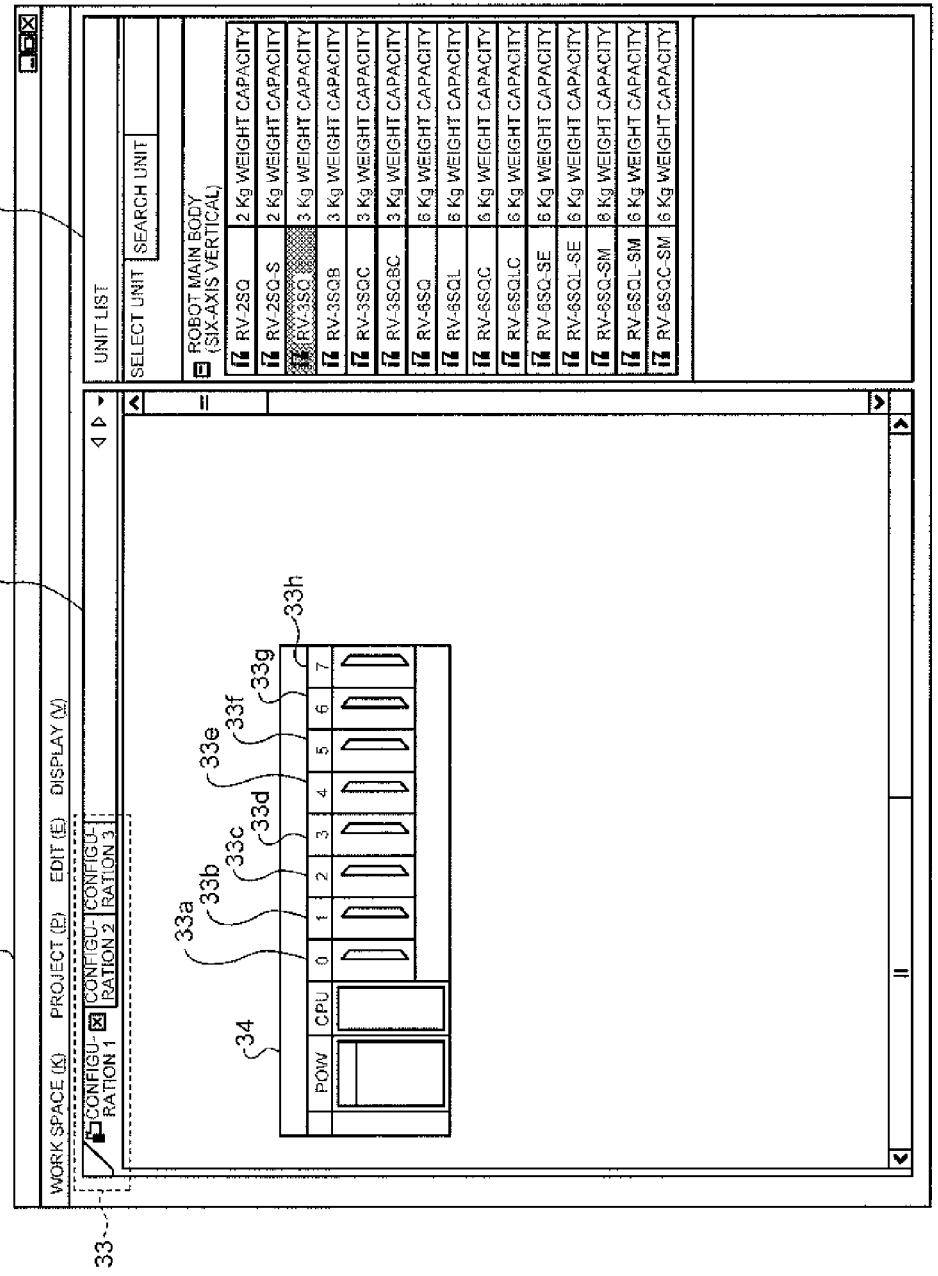
FIG. 3 is a diagram of a screen example displayed on a display device.
Figure 4:
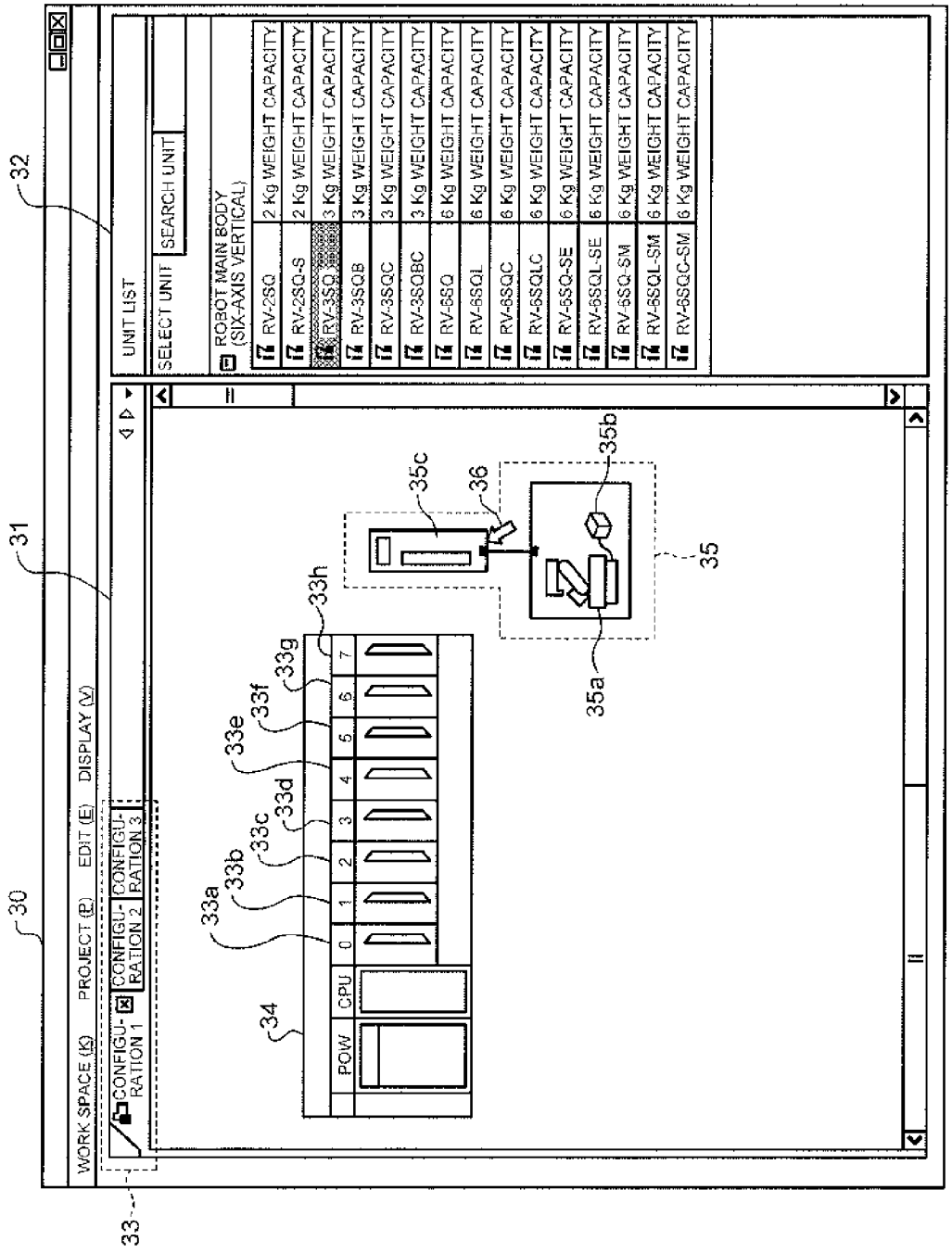
FIG. 4 is a diagram of a screen example displayed on the display device.
Figure 5:
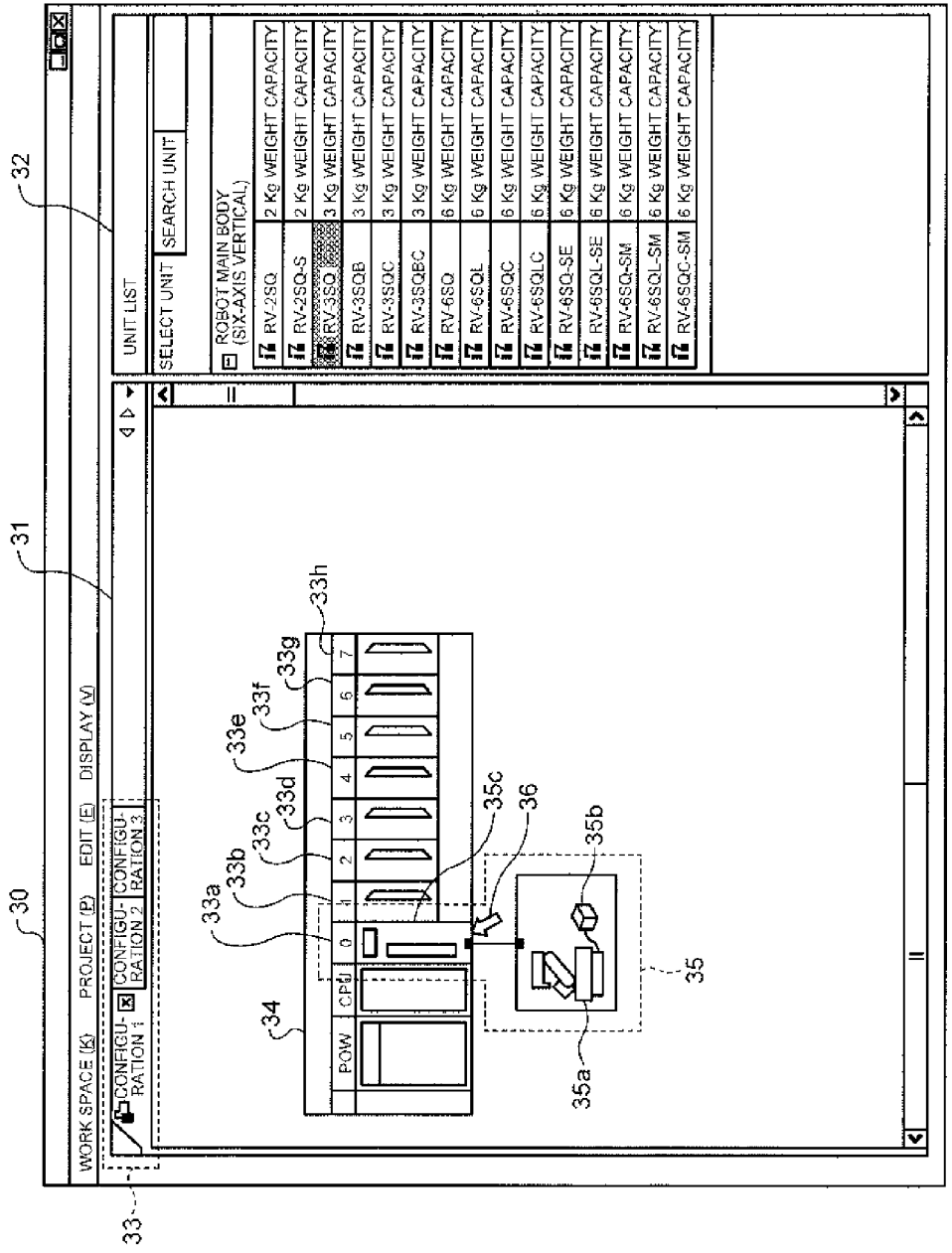
FIG. 5 is a diagram of a screen example displayed on the display device.

FIGS. 3, 4, and 5 show screen examples displayed on the display device 14. As shown in the figures, on a display screen 30, the configuration diagram editing screen 31 generated by the editing control section 21, on which editing of a system configuration diagram is performed, and the component list display screen 32 generated by the component-list generating section 22 are displayed. In the following explanation, a robot main body, a robot controller, and a robot CPU unit are arranged on the system configuration diagram. The robot main body is connected to the robot controller. The robot controller is connected to the robot CPU unit. The robot CPU unit outputs a target coordinate to the robot controller. The robot controller supplies a driving current to the robot main body such that the position of an end effector included in the robot main body follows the input target coordinate. That is, to cause the robot main body to operate, the user needs to prepare a robot controller and a robot CPU unit matching specifications of the robot main body.

The configuration diagram editing screen 31 includes a plurality of tabs 34. The user can simultaneously edit a plurality of different system configuration diagrams in parallel while switching the system configuration diagrams by selecting the tabs 34.

In FIG. 3, a display object 33 of a base unit is displayed on the configuration diagram editing screen 31. In the display object 33 of the base unit, eight slots (slot indications 33a to 33h) are rendered. Numbers 0 to 7 are respectively affixed to the slot indications 33a to 33h in ascending order from a power supply unit side. When a display object indicating a unit is arranged to be superimposed on one of the eight slot indications 33a to 33h, the system construction supporting apparatus 10 can recognize that the unit and a slot corresponding to an arrangement position of the unit are connected. On the component list display screen 32, a list of model names of robot bodies of six-axis vertical multi-joint robots are displayed. In the respective model names, weight capacities are displayed as reference information in association with the model names. Concerning the robot main body, "the number of axes" and "a weight capacity" are included in the specifications in the embodiment. That is, concerning the robot main body, component information 40 in which information including the number of axes and the weight capacity is recorded for each of the model names is stored in the component-information storing section 23.

FIG. 4 shows a state in which the user selects, with the mouse, one of the robot main bodies displayed as a list on the component list display screen 32 and drags the selected robot onto the configuration diagram editing screen 31. As shown in the figure, when the user drags a display object 35a indicating the selected robot main body onto the configuration diagram editing screen 31, a robot controller and a robot CPU unit matching specifications of the selected robot main body (i.e., connectable to the selected robot main body) are automatically selected. A display object 35b indicating the automatically selected robot controller and a display object 35c indicating the automatically selected robot CPU unit are generated. The display objects 35a to 35c are automatically integrated as one group and arranged in a position where the objects are dropped. The integration means processing for associating display objects such that, when operation such as movement or deletion is applied to one display object, the same operation is applied to other display objects integrated with the one display object (i.e., all the other display objects belonging to the same group as the one display object). Reference numeral 36 denotes a mouse pointer that is dragging an integrated and displayed display object. During the drag, the mouse pointer 36 is placed on the display object 35c indicating the robot CPU unit. However, the mouse pointer 36 can be placed anywhere as long as the mouse pointer 36 can indicate that the display object 35 is being dragged.

In the first embodiment of the present invention, when a component at a connection destination, specifications of which match specifications of the selected component, is not uniquely determined, the system construction supporting apparatus 10 urges the user to perform an input for designating the component at the connection destination.

Figure 6:
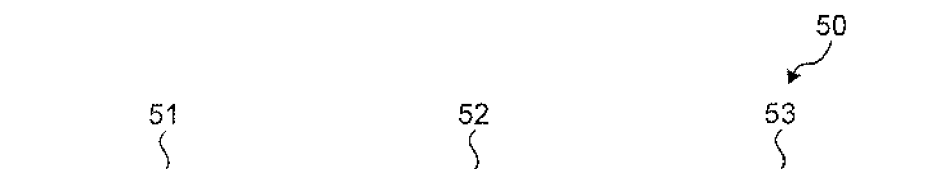
FIG. 6 is a diagram of an example of association information.

A relation among connectable components is recorded in the association information stored in the association-information storing section 24. FIG. 6 is a diagram of an example of the association relation. As shown in the figure, the association information 50 includes a table configuration including a field 51 in which a model name of a robot CPU unit is stored, a field 52 in which a model name of a robot controller is stored, and a field 53 in which a model name of a robot main body is stored. Respective entries registered in the association information 50 indicate relations among robot CPU units, robot controllers, and robot main bodies, specifications of which match one another. That is, the respective entries included in the association information 50 indicate combinations of a plurality of components that can be connected to one another and used as sets.

FIG. 5 shows a state in which the display object 35c is dropped to overlap a display position of the slot indication 33a. As shown in the figure, the respective display objects 35a to 35c included in the display object 35 are simultaneously moved by the drag operation by the mouse pointer 36. When the display object 35c is dropped to overlap the display position of the slot indication 33a, a connection relation between a slot of a slot number 0 and a robot CPU unit indicated by the display object 35c, a connection relation between the robot CPU unit indicated by the display object 35c and a robot controller indicated by the display object 35b, and a connection relation between the robot controller indicated by the display object 35b and a robot main body indicated by the display object 35a are set. When the display object 35 is dropped on the configuration diagram editing screen 31 without coming into contact with another display object (a display object of the base unit), connection relations among components included in the display object 35, i.e., the connection relation between the robot CPU unit indicated by the display object 35c and the robot controller indicated by the display object 35b and the connection relation between the robot controller indicated by the display object 35b and the robot main body indicated by the display object 35a are set.

Figures 1, 7:
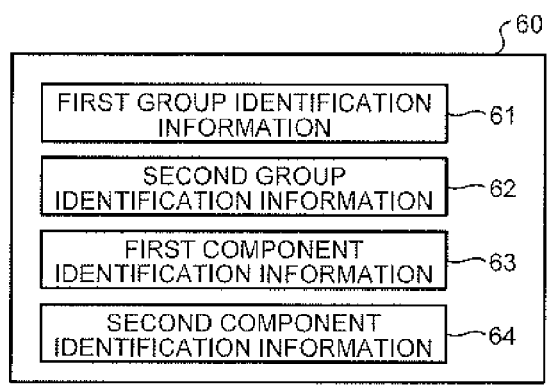
Figures 2, 7:
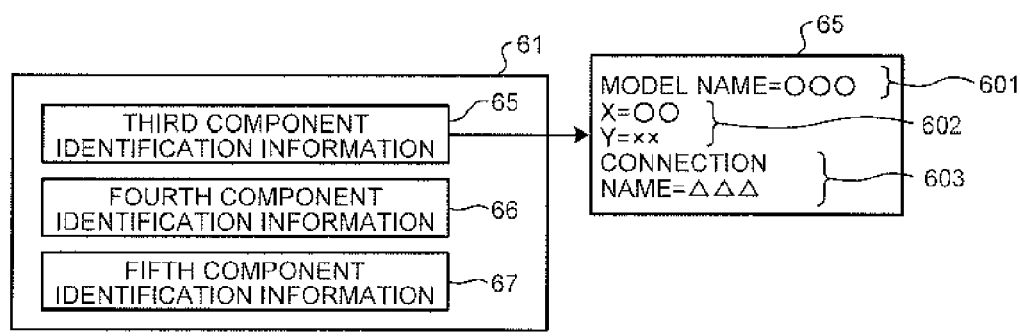

The editing control section 21 records the set connection relations in the system configuration setting information 60 stored in the configuration storing section 28. FIGS. 7-1 and 7-2 are diagrams of data configuration examples of the system configuration setting information 60. As shown in the figures, the system configuration setting information 60 includes identification information of groups in which association among a plurality of components, display objects of which are integrated, is described (first group identification information 61 and second group identification information 62) and identification information of one or more components (first component identification information 63 and second component identification information 64). The identification information of the groups includes identification information of components included in the group. It is indicated that the first group identification information 61 includes identification information of three components (third component identification information 65, fourth component identification information 66, and fifth component identification information 67). The identification information of the components includes a description 601 of a model name, a description 602 of an arrangement position on a system configuration diagram, and a description 603 of identification information of a component at a connection destination. Identification information of the base unit can include the description 603 of the connection destination by the number of slots. The editing control section 21 sequentially reflects, every time the system configuration diagram is edited, editing content on the identification information of the components and the identification information of the groups. The editing includes operation for moving integrated display objects, operation for deleting the integrated display objects, and operation for changing one of the integrated display objects besides operation for arranging a new display object on the system configuration diagram.

In this way, when the user simply performs an input for selecting one component and arranging the component on the system configuration diagram, other components, specifications of which match specifications of the selected component, are integrated with the selected component and arranged. Therefore, a workload on the user is reduced compared with a workload imposed on the user when the respective components are separately selected and arranged. The integrated plurality of components are simultaneously moved. Therefore, a workload on the user is reduced compared with a workload imposed on the user when the respective components are separately moved. Further, a plurality of components, specifications of which match one another, can be automatically integrated. Therefore, a workload on the user is reduced compared with a workload imposed on the user when the user integrates components that the user desires to integrate after selecting the components. Moreover, it is possible to prevent components, specifications of which do match each other, from being integrated by mistake.

Figure 8:
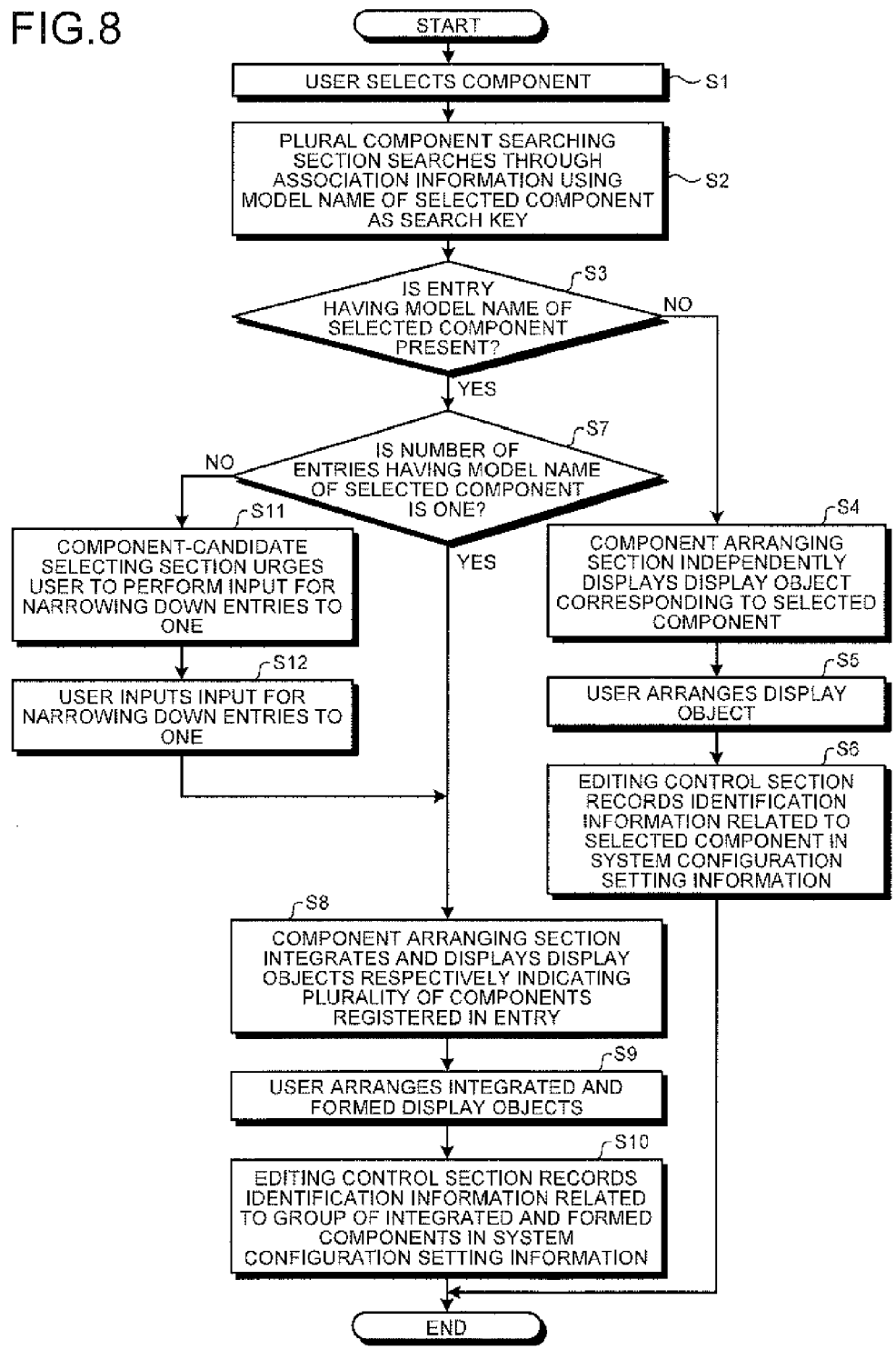
FIG. 8 is a flowchart for explaining the operation of the system construction supporting apparatus performed when a user arranges a component on a system configuration diagram.

The operation of the system construction supporting apparatus 10 is explained. FIG. 8 is a flowchart for explaining the operation of the system construction supporting apparatus 10 performed when the user arranges a component on the system configuration diagram.

First, the user selects a component (step S1). Then, the component searching section 25 searches through the association information 50 stored in the association-information storing section 24 using a model name of the selected component as a search key (step S2). In processing at step S1, "selected" means that, for example, a drag of one of the components displayed as a list on the component list display screen 32 is started.

Subsequently, the component searching section 25 determines an entry having the model name of the selected component (in other words, a combination among components connectable to the selected component) is present (step S3). When an entry having the model name of the selected component is absent (No at step S3), the component arranging section 27 independently displays a display object corresponding to the selected component in a drag position by the mouse pointer 36 on the configuration diagram editing screen 31 (step S4). The user drops (arranges) the display object indicating the selected component on the configuration diagram editing screen 31 (step S5). Then, the editing control section 21 records identification information related to the selected component in the system configuration setting information 60 (step S6), and the operation ends.

When an entry having the model name of the selected component is present (Yes at step S3), the component searching section 25 further determines whether the number of entries having the model name of the selected component is one (step S7). When the number of entries having the model name of the selected component is one (Yes at step S7), the component arranging section 27 displays, in a drag position by the mouse pointer 36 on the configuration diagram editing screen 31, a display object obtained by integrating display objects respectively indicating a plurality of components registered in the entry (step S8). The user drops the integrated and formed display object on the configuration diagram editing screen 31 (step S9). Then, the editing control section 21 records identification information related to a group of the integrated and formed components in the system configuration setting information 60 (step S10), and the operation ends.

When the number of entries having the model name of the selected component is not one (No at step S7), i.e., the number of entries is more than one, the component-candidate selecting section 26 urges the user to perform an input for narrowing down the entries to one (step S11). As display for urging the user to perform the input for narrowing down the entries to one, for example, a method of displaying a list of a found plurality of entries on the display screen 30 and urging the user to perform depression by the mouse pointer 36 on entry list display can be adopted. The user performs the input for narrowing down the entries to one (step S12). Then, the processing shifts to step S8. The component arranging section 27 displays, in a drag position by the mouse pointer 36 on the configuration diagram editing screen 31, a display object obtained by integrating display objects respectively indicating a plurality of components registered in the entry selected at step S12.

Figure 9:
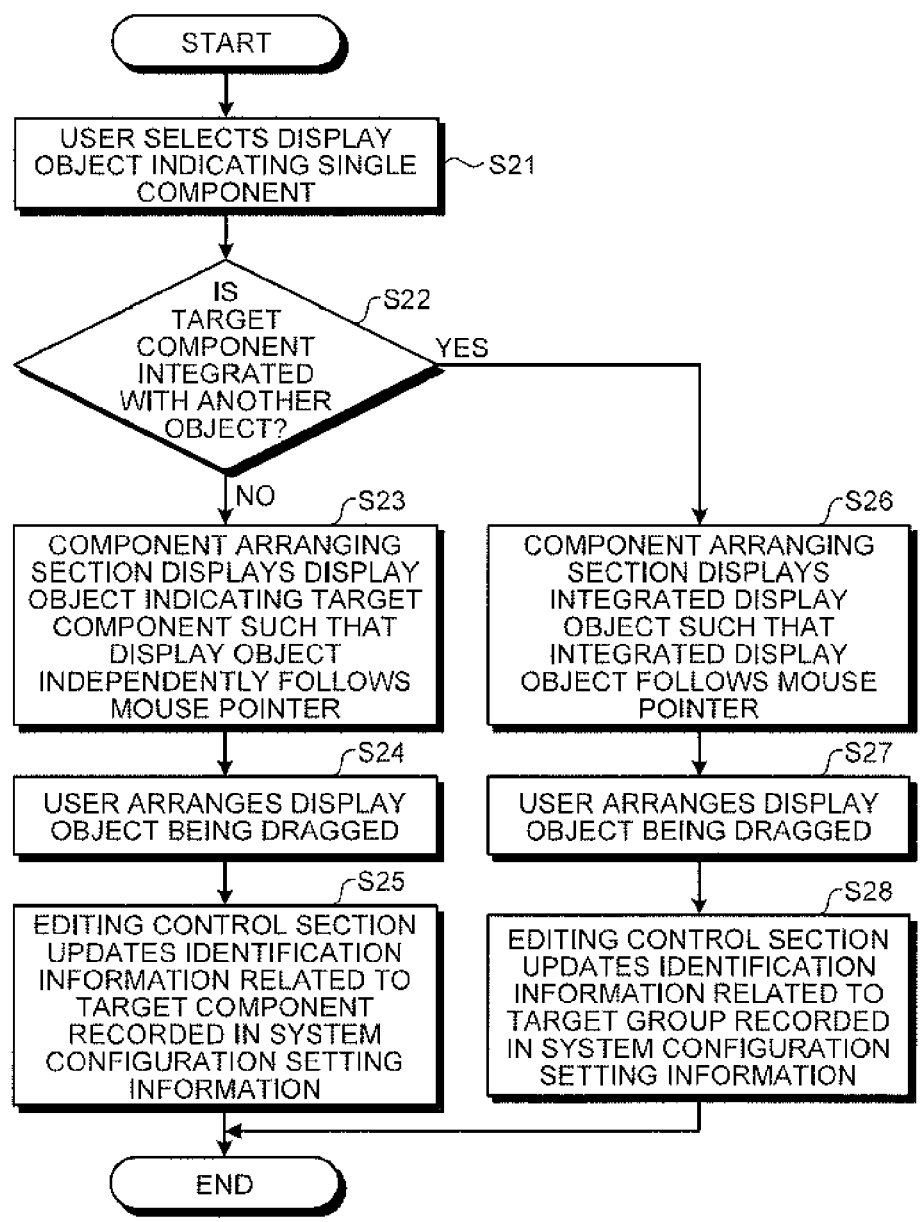
FIG. 9 is a flowchart for explaining the operation of the system construction supporting apparatus in the first embodiment performed when the user moves a component displayed on the system configuration diagram.

FIG. 9 is a flowchart for explaining the operation of the system construction supporting apparatus 10 performed when the user moves a component displayed on the system configuration diagram.

First, the user selects a display object indicating a single component (step S21). Then, the component arranging section 27 searches through the system configuration setting information 60 stored in the configuration storing section 28 and determines whether the target component is integrated with another component (step S22). The component arranging section 27 can determine, by checking whether identification information related to the target component is included in identification information related to a group, whether the target component is integrated with another component. In the processing at step S21, "selected" means that, for example, a drag of one of display objects displayed on the configuration diagram editing screen 31 is started.

When the target component is not integrated with another component (No at step S22), the component arranging section 27 displays the display object indicating the target component such that the display object independently follows the mouse pointer 36 on the configuration diagram editing screen 31 (step S23). The user drops, on the configuration diagram editing screen 31, the display object being dragged (step S24). Then, the editing control section 21 updates identification information related to the target component recorded in the system configuration setting information 60 (step S25), and the operation ends.

When the target component is integrated with another component (Yes at step S22), the component arranging section 27 displays a display object to be integrated with the target component and the other component and displayed such that the display object follows the mouse pointer 36 on the configuration diagram editing screen 31 (step S26). The user drops, on the configuration diagram editing screen 31, the display object being dragged (step S27). Then, the editing control section 21 updates identification information related to the target group recorded in the system configuration setting information 60 (step S28), and the operation ends.

The processing in moving the display object is explained above with reference to FIG. 9. However, when the display object is deleted, an integrated plurality of display objects can be deleted at a time according to the same processing flow.

As explained above, according to the first embodiment of the present invention, the system construction supporting apparatus 10 is configured to include the component searching section 25 configured to search through, when receiving an input for arranging a component on the system configuration diagram anew, the association information 50 in which the combinations among the components connectable to one another are described and extract a component connectable to a component selected by the input and the component arranging section 27 configured to connect and integrate a display object of the selected component and a display object of the extracted component each other and arrange the display objects in designated arrangement positions on the system configuration diagram and apply, when receiving an input for designating and moving or deleting one of the display objects related to the plurality of components integrated and arranged on the system configuration diagram, the same operation to the respective integrated plurality of display objects. Therefore, when the user simply performs an input for selecting one component and arranging the component on the system configuration diagram, other components, specifications of which match specifications of the selected component, are integrated with the selected component and arranged. Therefore, a workload on the user is reduced compared with a workload imposed on the user when the respective components are separately selected and arranged. The integrated plurality of components are simultaneously moved and deleted. Therefore, a workload on the user is reduced compared with a workload imposed on the user when the respective components are separately moved and deleted. Further, a plurality of components, specifications of which match one another, can be automatically integrated. Therefore, a workload on the user is reduced compared with a workload imposed on the user when the user integrates components that the user desires to integrate after selecting the components. Moreover, it is possible to prevent components, specifications of which do not match one another, from being integrated by mistake. That is, it is possible to reduce a load involved in creation of the system configuration diagram.

The component searching section 25 is configured to determine whether a plurality of combinations among components including a selected component are present and, when a plurality of combinations are present, urge the user to perform an input for narrowing down the combinations to one. Therefore, even when a plurality of combinations among components connectable to the selected component are present, the user can arrange, with a simple input, a plurality of components including the selected components.

Second Embodiment

Figure 10:
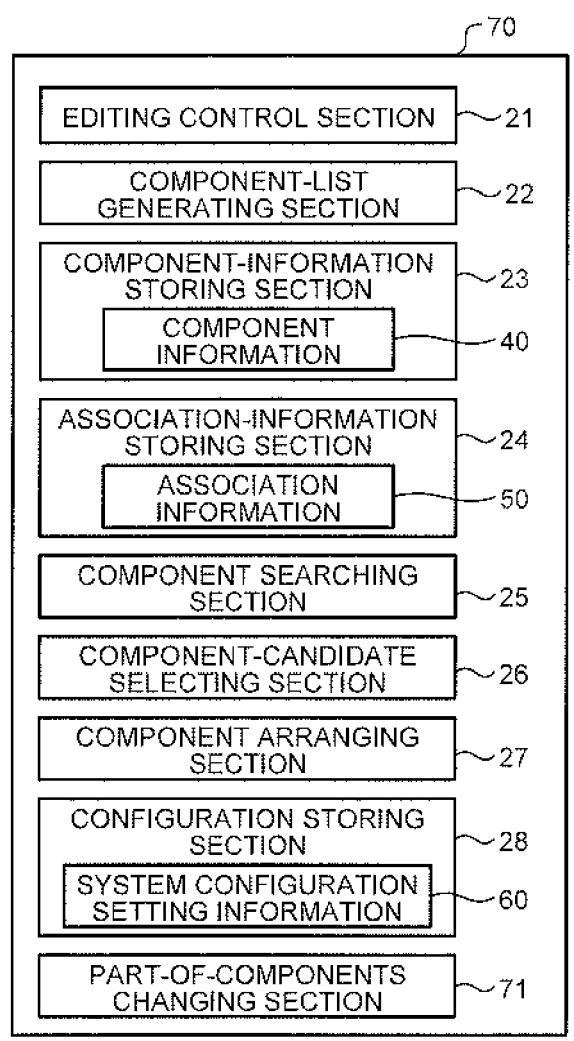
FIG. 10 is a diagram of the functional configuration of a system construction supporting apparatus in a second embodiment.

FIG. 10 is a diagram of the functional configuration of a system construction supporting apparatus in a second embodiment. As shown in the figure, a system construction supporting apparatus 70 in the second embodiment includes a functional configuration in which a part-of-components changing section 71 configured to change one of an integrated plurality of components is added to the functional configuration in the first embodiment.

Figure 11:
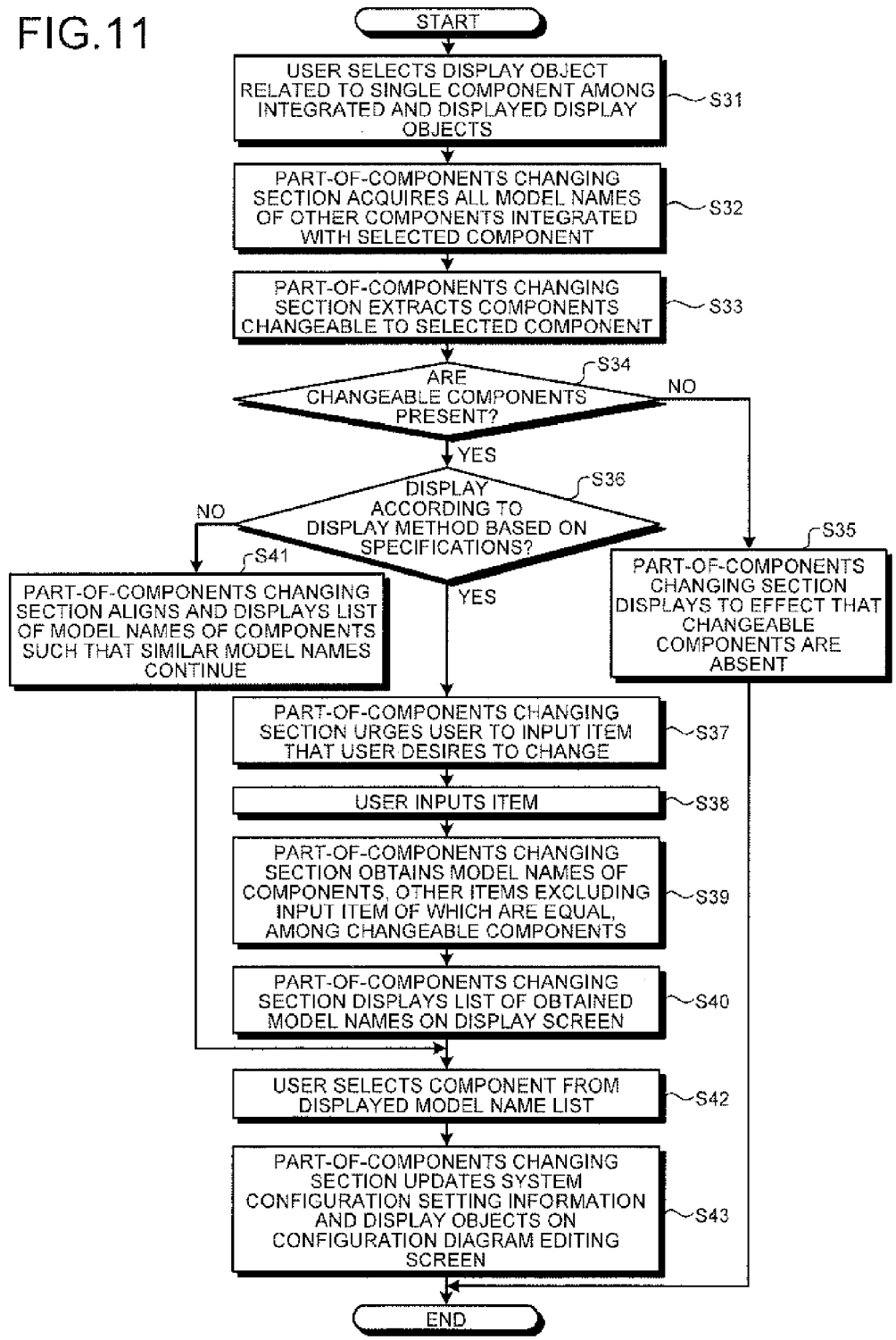
FIG. 11 is a flowchart for explaining the operation of the system construction supporting apparatus performed when a user changes one of an integrated plurality of components displayed on a system configuration diagram.

FIG. 11 is a flowchart for explaining the operation of the system construction supporting apparatus 70 performed when a user changes one of an integrated plurality of components displayed on a system configuration diagram.

As shown in the figure, the user selects a display object related to a single component among integrated and displayed display objects (step S31). The part-of-components changing section 71 acquires, referring to the system configuration setting information 60 stored in the configuration storing section 28, all model names of other components integrated with the component related to the selected display object (step S32). Examples of "selecting a display object at step S31" include operation for right-clicking the display object to open a menu of a command list and selecting a "change" command from the opened menu.

After the processing at step S32, the part-of-components changing section 71 searches through the association information 50 stored in the association-information storing section 24 using all the model names as a search key of an AND condition to thereby extract components changeable to a component selected by the selection of the display object (step S33). The changeable component means a component that is different from the selected component and specifications of which match specifications of all other components integrated with the selected component.

Subsequently, the part-of-components changing section 71 determines whether changeable components are present (step S34). When changeable components are absent (No at step S34), the part-of-components changing section 71 displays, on the display screen 30, to the effect that changeable components are absent (step S35), and the operation ends.

When changeable components are present (Yes at step S34), the part-of-components changing section 71 selects whether a list of the changeable components is displayed according to a display method based on specifications or a display method based on model names (step S36). The display method based on specifications is a display method for displaying, as a list, only components satisfying specific conditions concerning specifications. As an example, it is assumed that the part-of-components changing section 71 focuses on a specific item designated by the user among specifications of the selected components and displays a list of model names of components, the focused item of which is equal to that of the selected components. The display method based on model names is a display method for aligning model names based on the model names. It is assumed that the part-of-components changing section 71 displays a list of model names such that similar model names continue.

The part-of-components changing section 71 can urge, every time the part-of-components changing section 71 executes the processing at step S36, the user to perform an input for designating one of the display methods and select the display method designated by the user. Alternatively, the part-of-components changing section 71 can retain setting information including a description for designating a display method in a predetermined storage region and, in the processing as step S36, select a display method by referring to the setting information.

When the part-of-components changing section 71 selects the display method based on specifications (Yes at step S36), the part-of-components changing section 71 urges the user to input an item that the user desires to change among the specifications of the selected component (step S37). The part-of-components changing section 71 acquires model names of components, other items excluding the input items of which are equal to those of the selected component, among the changeable components (step S39). Specifically, the part-of-components changing section 71 searches through the component information 40 stored in the component-information storing section 23 using all the items excluding the input items among the specifications of the selected component as a search key of an AND condition and acquires model names of components included in the components extracted by the processing at step S33 among obtained search results. The part-of-components changing section 71 displays a list of the obtained model names on the display screen 30 (step S40).

At step S39, the part-of-components changing section 71 acquires model names of components, the other items excluding the item designated by the user of which are equal to those of the component selected at step S31. However, the part-of-components changing section 71 can acquire model names of components, the item designated by the user of which is equal to that of the component selected at step S31.

Figure 12:
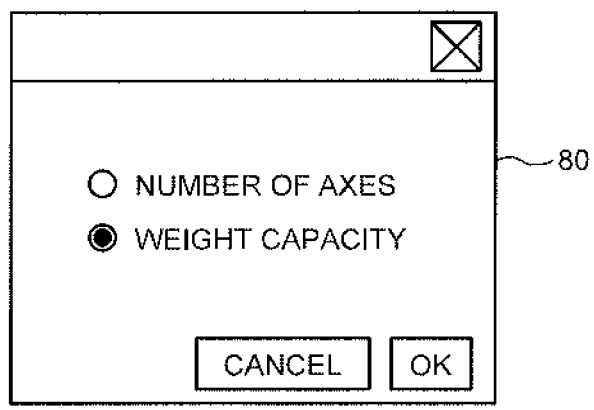
FIG. 12 is a diagram of a screen example for urging the user to input an item that the user desires to change.

FIG. 12 is a diagram of a screen example for urging the user to input an item that the user desires to change generated by the part-of-components changing section 71 in the processing at step S37. It is assumed that a robot main body is selected by the processing at step S31. As shown in the figure, an item "number of axes" and an item "weight capacity", which are specifications of the robot main body, are displayed on the input screen 80. At the left ends of the display of the items, selection buttons on which black circles are displayed on the inner sides when pressed by the mouse pointer 36 are displayed. The selection button on which the black circle is displayed indicates a state in which the item displayed on the right side is selected. When an OK button is pressed in the state in which the item is selected, reception of an input of the selected state item is completed.

Figure 13:
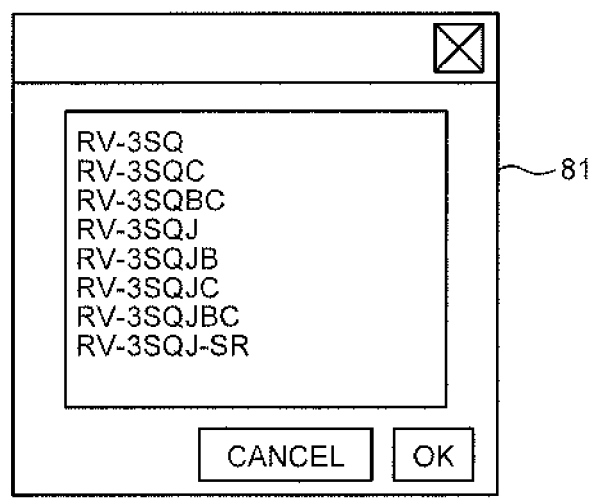
FIG. 13 is a diagram of a screen example displayed by processing at step S40.

FIG. 13 is a diagram of a screen example displayed by the processing at step S40. When the "weight capacity" is input at step S38, a list of model names of commodities, the number of axes of which is the same as that of the component that the user desires to change and the weight capacity of which is different from that of the component that the user desires to change, is displayed on a display screen 81.

Figure 14:
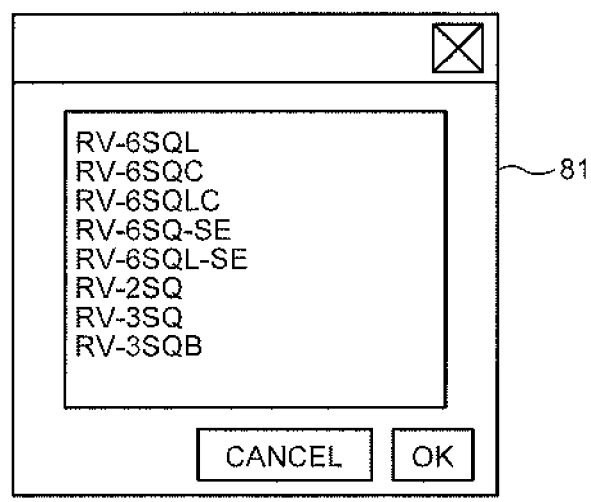
FIG. 14 is a diagram of a screen example displayed by processing at step S41.

When the part-of-components changing section 71 selects the display method based on model names (No at step S36), the part-of-components changing section 71 aligns and displays the list of the model names of the components extracted by the processing at step S33 such that similar model names continue (step S41). FIG. 14 is a diagram of a screen example displayed by the processing at step S41. As shown in the figure, similar model names are displayed to continue on the display screen 81.

The user performs an input for selecting one component from the display screen 81 displayed by the processing at step S40 or step S41 (step S42). Then, the part-of-components changing section 71 updates the system configuration setting information 60 stored in the configuration storing section 28 and updates the display object displayed on the configuration diagram editing screen 31 and selected at step S31 to a display object related to the component selected at step S42 (step S43), and the operation ends. "Updating the system configuration setting information 60 at step S43" corresponds to overwriting the description 601 of the model name included in the identification information of the component selected at step S31 with a model name of the component selected at step S42. That is, the display object designated at step S31 is replaced with the display object corresponding to the component selected at step S42 without an integrated relation with the other display objects being released.

As explained above, according to the second embodiment of the present invention, the part-of-components changing section 71 is configured to search through, when receiving an input for designating and changing one of display objects integrated and arranged on the system configuration diagram, the association information 50 and extract components connectable to components indicated by other display objects integrated with the designated display object and replace, when receiving an input for designating a component anew from the extracted components, the display object designated at the time of the change input with a display object corresponding to the component designated anew without releasing the integration. Therefore, because it is possible to change a component without releasing the integration of the display objects, it is possible to further reduce a load on the user.

The part-of-components changing section 71 is configured to display, as a list, based on model names, components connectable to components indicated by the other display objects integrated with the designated display object and urge the user to designate a component at a change destination. Therefore, it is possible to reduce a load on the user for searching for the component at the change destination.

The part-of-components changing section 71 is configured to display, as a list, components satisfying conditions related to specifications among the components connectable to the components indicated by the other display objects integrated with the designated display object and urge the user to designate a component at a change destination. Therefore, it is possible to reduce a load on the user for searching for the component at the change destination.

Third Embodiment

In the first and second embodiments, the integration is explained as meaning the processing for associating display objects such that, when operation such as movement or deletion is applied to one display object, the same operation is applied to the other display objects integrated with the one display object. In a third embodiment, integration indicates that components are associated and display objects related to the respective components belonging to the same group are connected to one another by connection lines and displayed. That is, according to the third embodiment, when a user applies operation of movement to a display object integrated with another display object, it is possible to move the operated display object alone while deforming the connection lines among the display objects to keep a connection relation.

Figure 15:
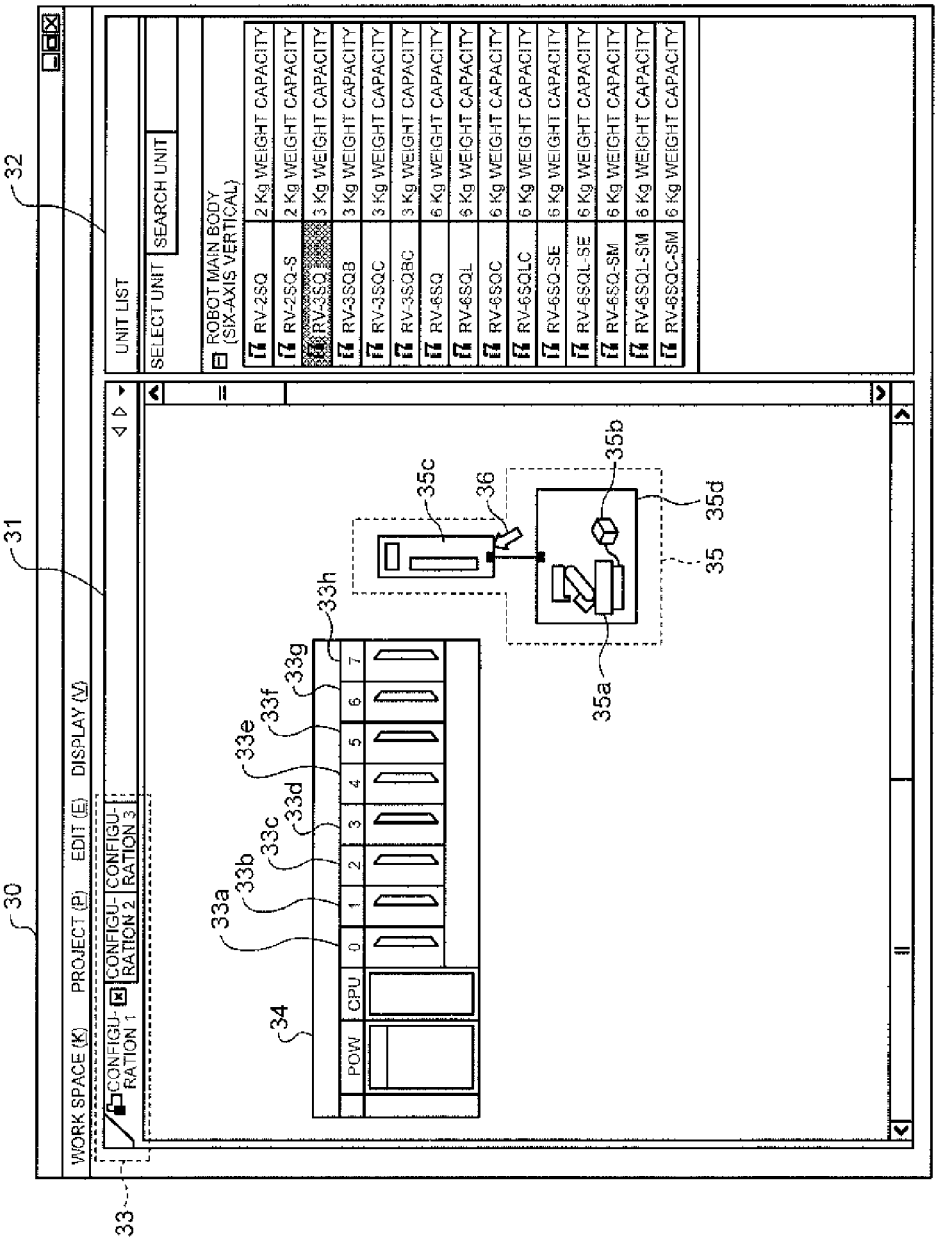
FIG. 15 is a diagram for specifically explaining characteristics of a system construction supporting apparatus in a third embodiment.

Characteristics of a system construction supporting apparatus in the third embodiment are specifically explained with reference to FIGS. 15 and 16. FIG. 15 shows a state in which the display objects 35*a* to 35*c* are integrated and arranged on the configuration diagram editing screen 31. In this state, a connection relation among components included in the display object 35, i.e., a connection relation between a robot CPU unit indicated by the display object 35*c* and a robot controller indicated by the display object 35*b* and a connection relation between a robot controller indicated by the display object 35*b* and a robot main body indicated by the display object 35*a* are set. The display object 35*c* indicating the robot CPU unit and a display object (the display object 35*d*) indicating a robot main body and a robot controller are connected by a connection line 37, which indicates that the display objects are integrated, and displayed. The display object 35*a* indicating the robot main body and the display object 35*b* indicating the robot controller can be connected by another connection line and displayed. When the user selects, with a mouse, the display object 35*c* indicating the robot CPU unit and drags the selected display object 35*c*, only the display object 35*c* is moved following the mouse pointer 36. During the movement of the display object 35*c*, the connection line 37 connecting the display object 35*a* and the display object 35*d* is deformed while keeping a connection relation between the display objects.

Figure 16:
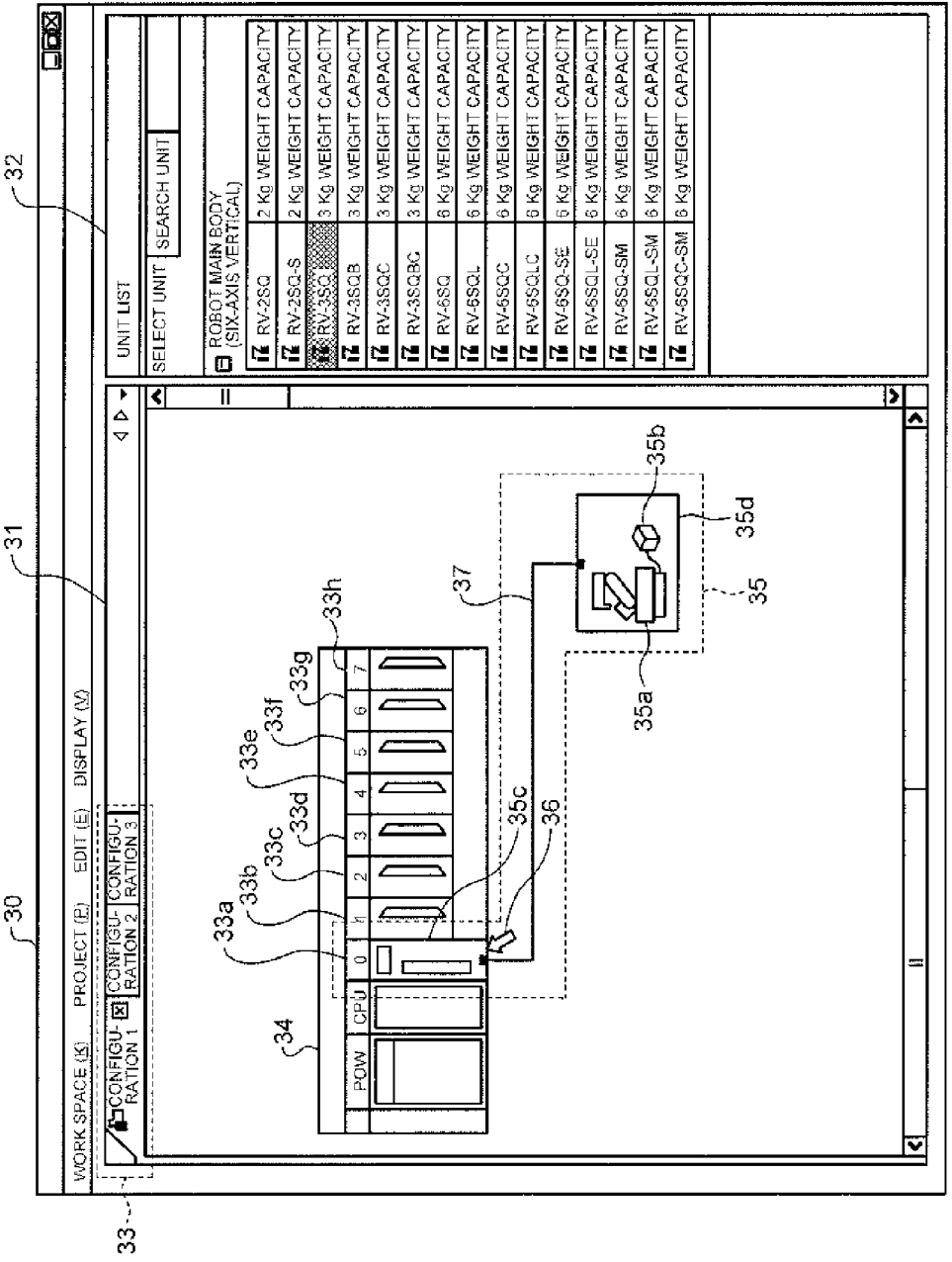
FIG. 16 is a diagram for specifically explaining the characteristics of the system construction supporting apparatus in the third embodiment.

FIG. 16 shows a state in which the display object 35*c* is dropped to overlap a display position of the slot indication 33*a*. As shown in the figure, a display position of the display object 35*d* is the same as the example shown in FIG. 15. However, only the display object 35*c* is displayed to be superimposed on the slot indication 33*a*. The connection line 37 connecting the display object 35*c* and the display object 35*d* is displayed in a shape deformed from the state shown in FIG. 15. When the system construction supporting apparatus reaches the state shown in FIG. 16, as explained with reference to FIG. 5, a connection relation between the slot of the slot number 0 and the robot CPU unit indicated by the display object 35*c*, a connection relation between the robot CPU unit indicated by the display object 35*c* and the robot controller indicated by the display object 35*b*, and a connection relation between the robot controller indicated by the display object 35*b* and the robot main body indicated by the display object 35*a* are set.

In the display example shown in FIG. 15, when the user selects the connection line 37 connecting the display object 35*c* and the display object 35*d* and drags the connection line 37, the respective display objects 35*a* to 35*c* included in the display objects 35 are simultaneously moved by drag operation by the mouse pointer 36.

Figure 17:
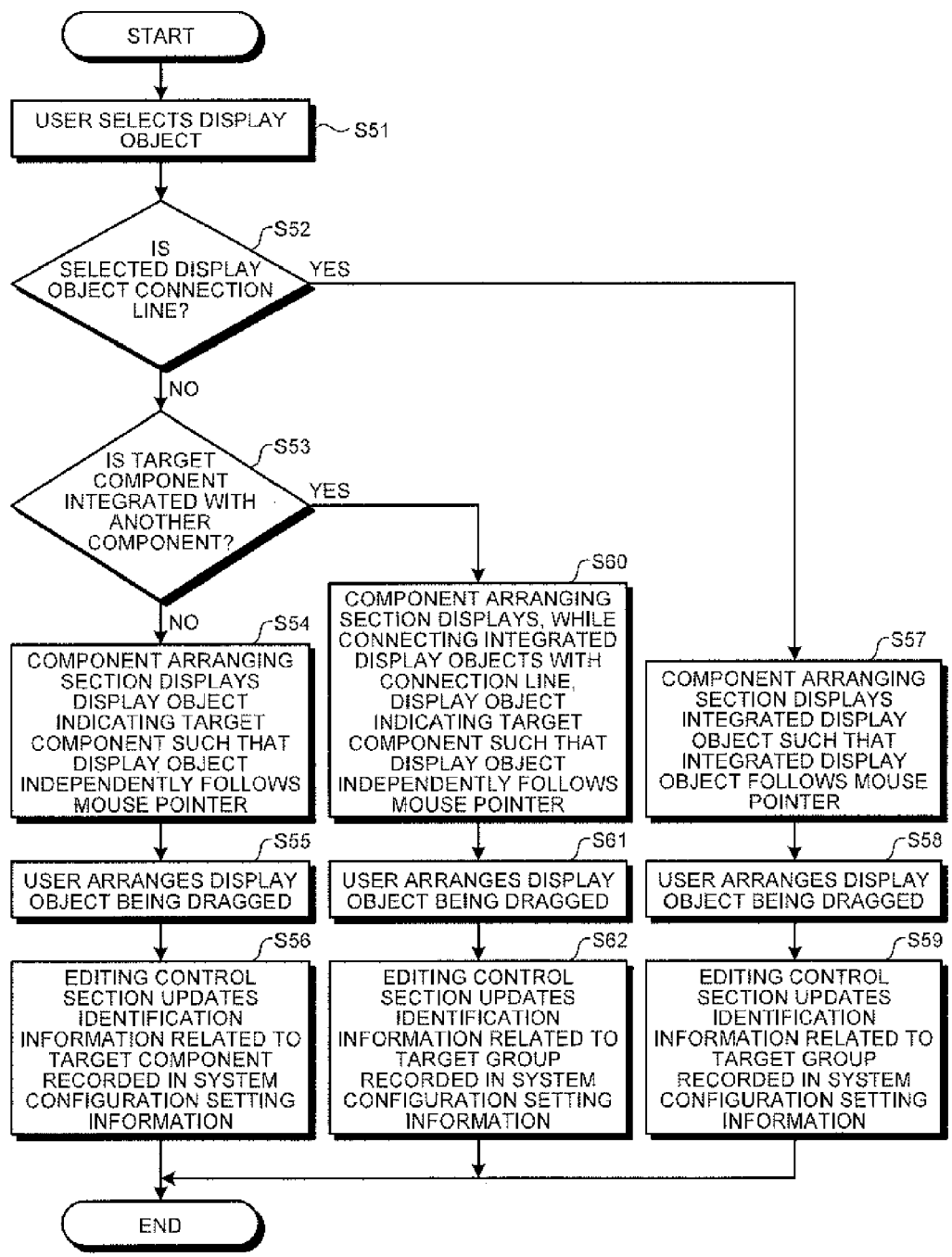
FIG. 17 is a flowchart for explaining the operation of the system construction supporting apparatus in the third embodiment performed when a user moves a component displayed on a system configuration diagram.

FIG. 17 is a flowchart for explaining the operation of the system construction supporting apparatus in the third embodiment performed when the user moves a component displayed on the system configuration diagram.

First, the user selects a display object (step S51). Then, the component arranging section 27 determines whether the selected display object is a connection line (step S52). The component arranging section 27 can determine, by determining whether the selected display object is stored in the configuration storing section 28, whether the selected display object is a connection line. That is, when identification information related to a component corresponding to the selected display object is stored in the configuration storing section 28, the component arranging section 27 can determine that the selected object is not a connection line. When identification information related to the component corresponding to the selected display object is not stored in the configuration storing section 28, the component arranging section 27 can determine that the selected display object is a connection line.

When the selected display object is not a connection line (No at step S52), i.e., when the selected display object is a component, the component arranging section 27 determines whether a selected target component is integrated with another component (step S53). When the target component is not integrated with another component (No at step S53), at steps S54 to S56, kinds of processing respectively same as steps S23 to S25 are executed.

When the selected display object is a connection line (Yes at step S52), at steps S57 to S59, kinds of processing respectively same as steps S26 to S28 are executed.

When the target component is integrated with another component (Yes at step S53), the component arranging section 27 displays, while deforming a connection line connecting the target component and the other component integrated with the target component while maintaining a connection relation, the display object indicating the target component such that the display object independently follows a mouse pointer (step S60). The user drops, on the configuration diagram editing screen 31, the display object being dragged (step S61). Then, the editing control section 21 updates identification information related to the target group recorded in the system configuration setting information 60 (step S62), and the operation ends.

As explained above, according to the third embodiment, the system construction supporting apparatus is configured to include the component searching section 25 configured to search through, when receiving an input for arranging a component on the system configuration diagram anew, the association information 50 in which the combinations among the components connectable to one another are described and extract a component connectable to a component selected by the input and the component arranging section 27 configured to connect, with a connection line, a display object of the selected component and a display object of the extracted component each other and arrange the display objects in designated arrangement positions on the system configuration diagram and independently move, when receiving an input for performing operation for designating and moving one of the display objects related to the plurality of components connected to each other by the connection line and arranged on the system configuration diagram, the designated display object while deforming a connection line connecting the display object designated by the input and another display object connected to the designated display object. Therefore, when the user simply performs an input for selecting one component and arranging the component on the system configuration diagram, other components, specifications of which match specifications of the selected component, are integrated with the selected component and arranged. Therefore, a workload on the user is reduced compared with a workload imposed on the user when the respective components are separately selected and arranged. A plurality of components, specifications of which match one another, can be automatically connected by the connection line. Therefore, a workload on the user is reduced compared with a workload imposed on the user when the user connects, with the connection line, components that the user desires to connect after selecting the components. Further, it is possible to prevent components, specifications of which do not matching each other, from being connected by the connection line by mistake. That is, it is possible to reduce a load involved in creation of the system configuration diagram.

The component arranging section 27 is configured to collectively move, when receiving an input for moving the connection line 37 connecting a plurality of display objects, together with the connection line 37, the display objects connected by the designated connection line 37. Therefore, because an integrated plurality of components are simultaneously moved, a workload on the user is reduced compared with a workload imposed on the user when the respective components are separately moved and deleted.

The third embodiment can be applied to the system construction supporting apparatus in the second embodiment. That is, the definition of integration in the second embodiment can be replaced with the definition of integration in the third embodiment, i.e., display objects are connected by the connection line and, even if one of the display objects connected by the connection line is moved, a connection relation by the connection line is maintained.

Fourth Embodiment

Figure 18:
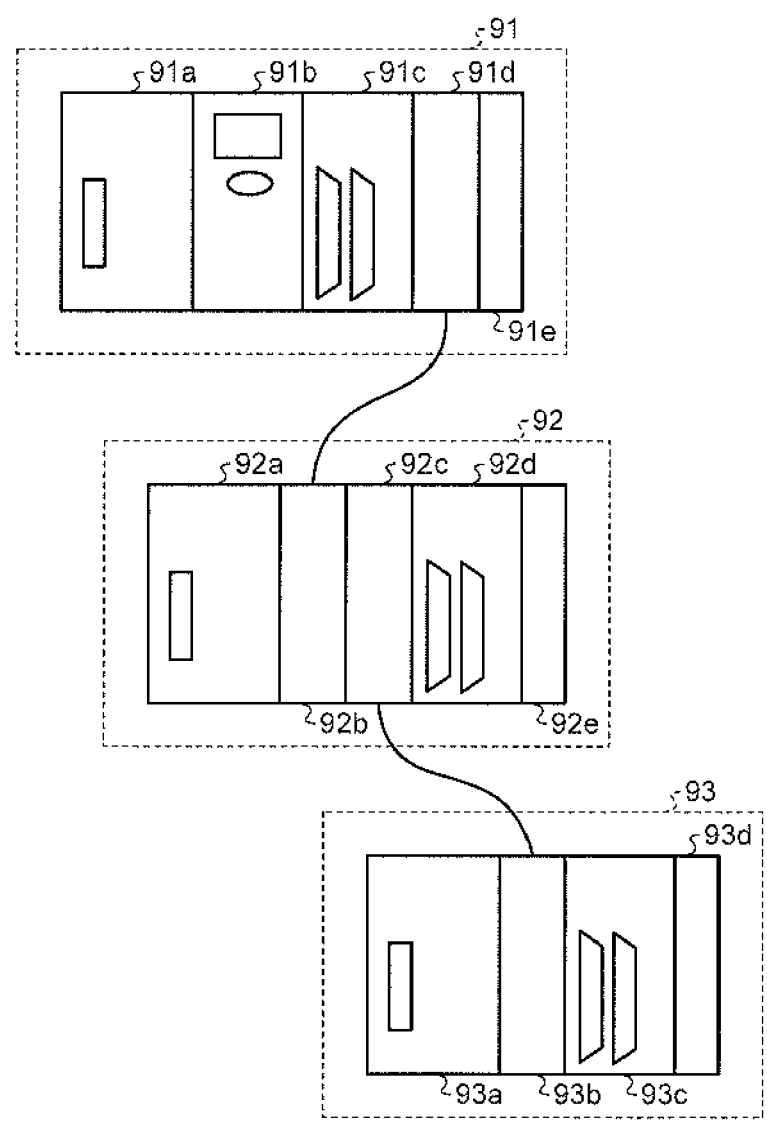
FIG. 18 is a diagram of a configuration example of a PLC of a building block type that does not require a base unit.

At present, there is a PLC of a building block type that does not require a base unit. FIG. 18 is a configuration diagram of the PLC of the building block type that does not require a base unit. As shown in the figure, a power supply unit 91a, a CPU unit 91b, a positioning unit 91c, a branching unit 91d, and an end cover 91e configure a PLC (a layer 91) of one unit (referred to as layer herein).

The branching unit 91d is an interface unit for connecting the PLC to a PLC of another layer. Specifically, the branching unit 91d is connected to an extension unit of the PLC of the other layer. The branching unit 91d is connected to an extension unit 92b in a PLC of a layer 92 including a power supply unit 92a, the extension unit 92b, a branching unit 92c, a positioning unit 92d, and an end cover 92e. The branching unit 92c is connected to an extension unit 93b of a PLC of a layer 93 including a power supply unit 93a, the extension unit 93b, a positioning unit 93c, and an end cover 93d. In this way, the branching unit 91d, the extension unit 92b, the branching unit 92c, and the extension unit 93b function as inter-layer connection components that connect the layers. The PLCs of the layers 91 to 93 connected by the inter-layer connection components can function as one PLC.

Figure 19:
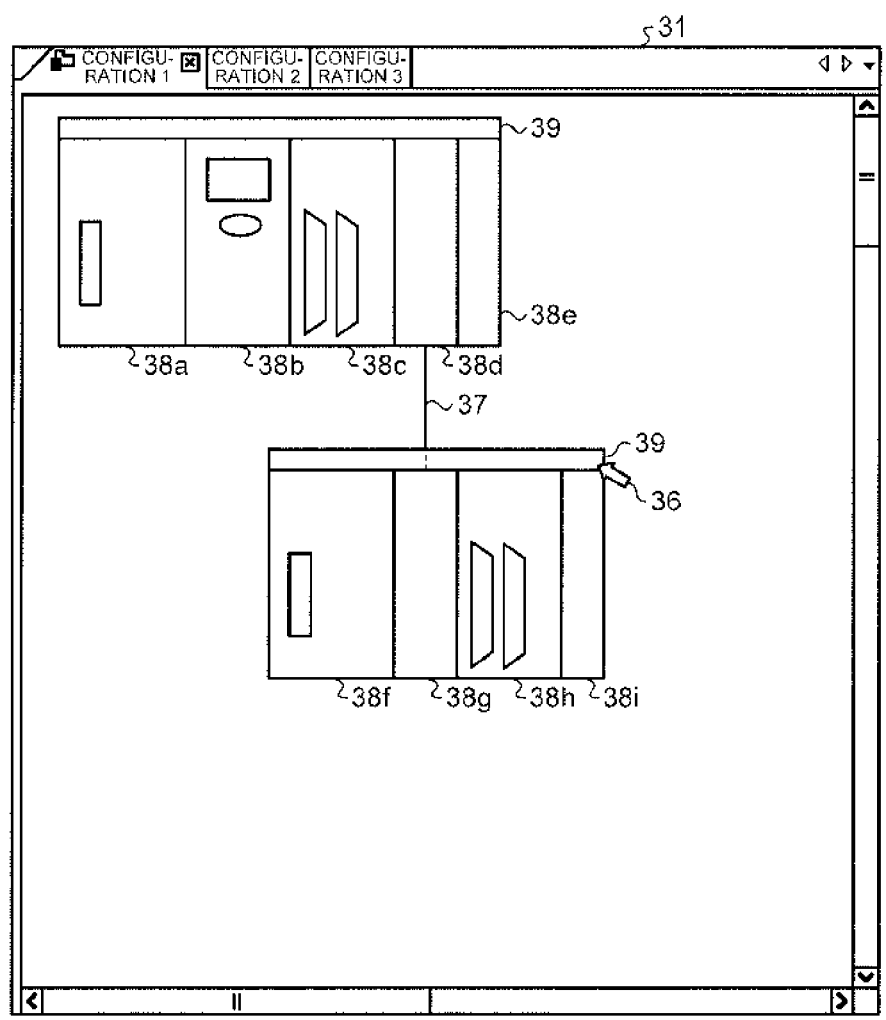
FIG. 19 is a diagram for specifically explaining characteristics of a system construction supporting apparatus in a forth embodiment.

Characteristics of a system construction supporting apparatus in a fourth embodiment are specifically explained with reference to FIGS. 19 to 21. FIG. 19 shows a state of the configuration diagram editing screen 31 on which display objects 38a to 38e respectively indicating a power supply unit, a CPU unit, a positioning unit, a branching unit, and an end cover included in a PLC of one layer and display objects 38f to 38i respectively indicating a power supply unit, an extension unit, a positioning unit, and an end cover included in a PLC of another layer are displayed. The display object 38d indicating the branching unit and the display object 38g indicating the extension unit are connected to each other by the connection line 37. On the configuration diagram editing screen 31, a layer selection object 39 is displayed for each of the layers. A user can collectively select one or more units included in a desired layer by selecting the layer selection object 39.

A joining relation among a plurality of display objects belonging to the same layer is set according to layer identification information explained below. A connection relation by the connection line 37 between a branching unit and an extension unit is set according to identification information related to a group as in the first to third embodiment. That is, specifications of the branching unit and specifications of the extension unit are registered in the component information 40 for each of model names and a relation between components, specifications of which match each other, (i.e., components connectable to each other) of the branching unit and the extension unit is registered in the association information 50. The branching unit and the extension unit are connected according to the procedure shown in FIG. 8. The system construction supporting apparatus can be configured such that one of the branching unit and the extension unit connected to each other can be changed according to the procedure explained in the second embodiment.

Figure 20:
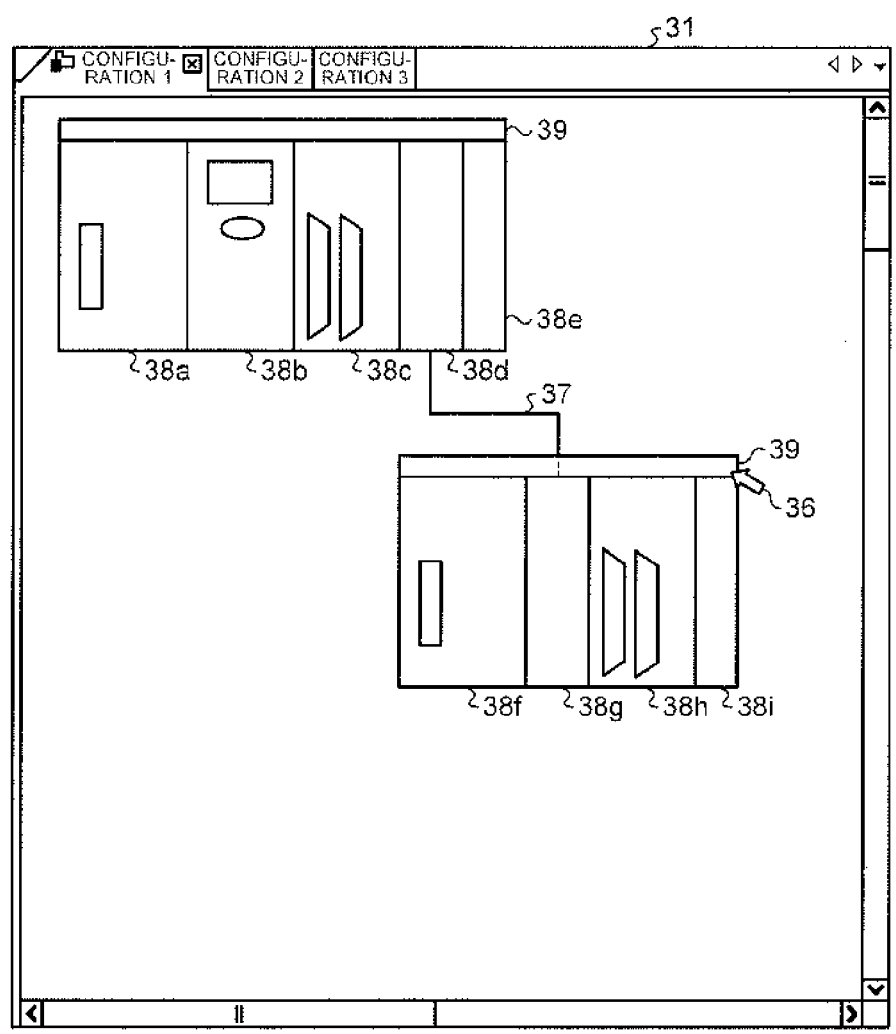
FIG. 20 is a diagram for specifically explaining the characteristics of the system construction supporting apparatus in the fourth embodiment.

FIG. 20 shows a state in which the user selects, with a mouse, the layer selection object 39 for designating a layer indicated by the display objects 38f to 38i and drags the selected layer selection object 39 on the configuration diagram editing screen 31. As shown in the figure, the display objects 38f to 38i of the layer designated by the selected layer selection object 39 are simultaneously moved following the movement of the selected layer selection object 39. After the movement, the display objects 38f to 38i are joined and displayed. A connection relation by the connection line 37 between the branching unit indicated by the display object 38*d* and the extension unit indicated by the display object 38*g* is maintained.

Figure 21:
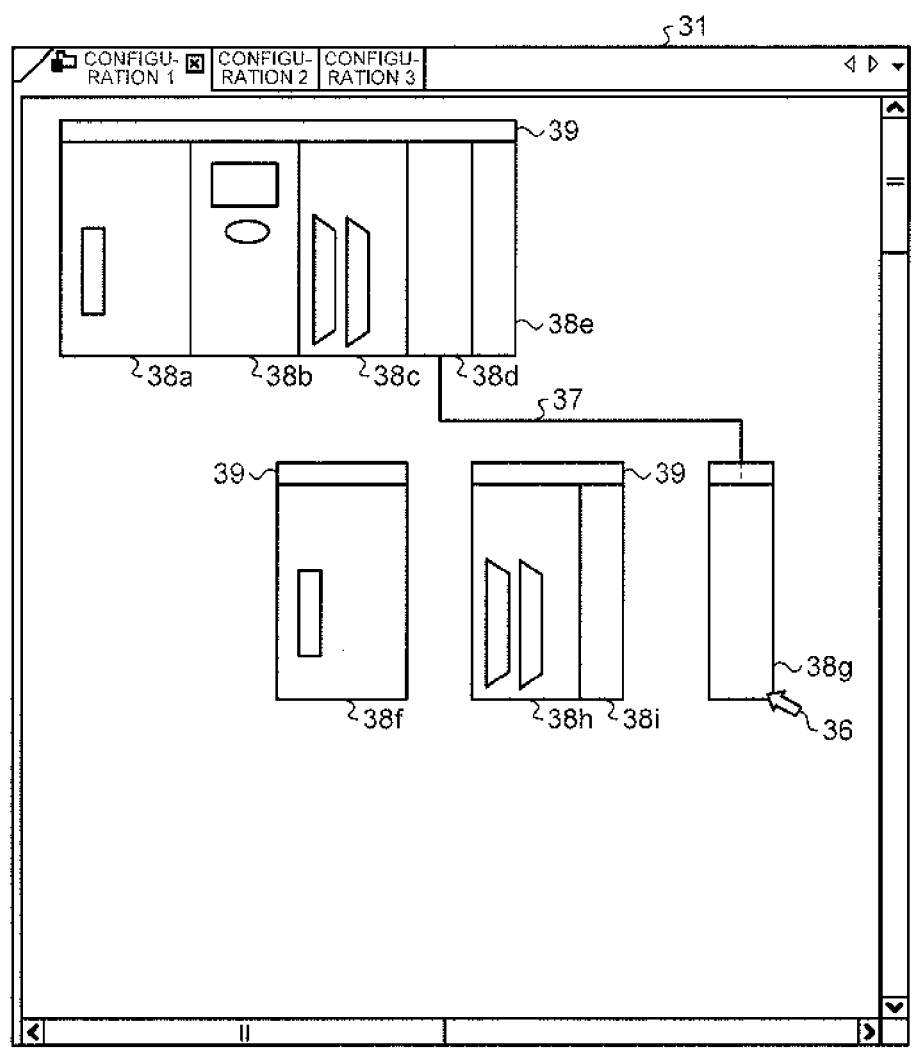
FIG. 21 is a diagram for specifically explaining the characteristics of the system construction supporting apparatus in the fourth embodiment.

FIG. 21 shows a state in which the user selects, with the mouse, the display object 38*g* indicating the extension unit and drags the selected display object 38*g* on the configuration diagram editing screen 31. As shown in the figure, the selected display object 38*g* is independently moved following the mouse pointer 36. The connection line 37 is deformed according to the movement of the display object 38*g* while a connection relation between the display object 38*d* and the display object 38*g* is maintained. In this state, a connection relation by the connection line 37 between the branching unit indicated by the display object 38*d* and the extension unit indicated by the display object 38*g* is maintained. The extension unit indicated by the display object 38*g* has lost a joining relation with the display objects 38*f*, 38*h*, and 38*i*.

Figure 22:
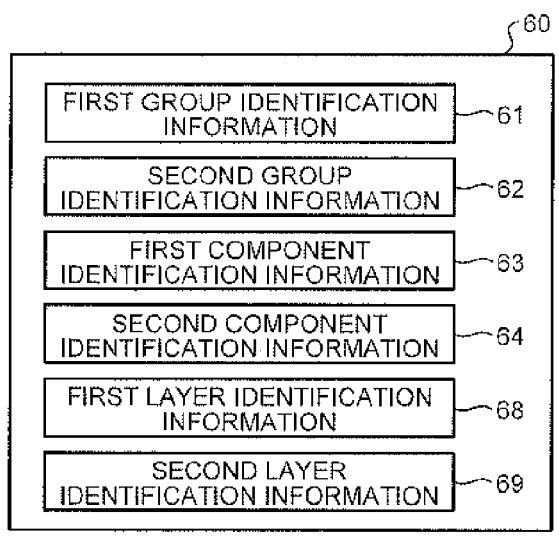
FIG. 22 is a diagram of a data configuration example of system construction setting information in the fourth embodiment.
Figure 23:
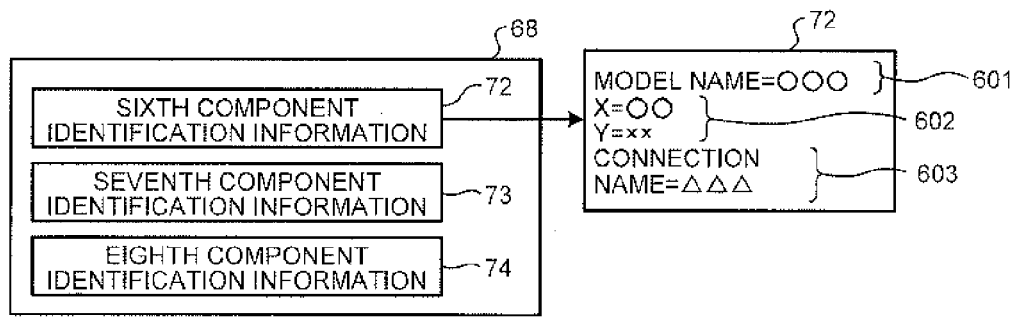
FIG. 23 is a diagram of a data configuration example of the system configuration setting information in the fourth embodiment.

FIGS. 22 and 23 are diagrams of a data configuration example of the system configuration setting information 60 in the fourth embodiment. As shown in the figures, the system configuration setting information 60 includes identification information of groups in which association of a plurality of components, display objects of which are integrated, is described (the first group identification information 61 and the second group identification information 62), identification information of one or more components (the first component identification information 63 and the second component identification information 64), and layer identification information in which association among a plurality of components belonging to the same layer is described for each of layers (first layer identification information 68 and second layer identification information 69). A connection relation between a branching unit and a connection unit is recorded in identification information of a group as explained above. The layer identification information includes identification information related to components belonging to the same layer. It is indicated that the first layer identification information 68 includes identification information of three components (sixth component identification information 72, seventh component identification information 73, and eighth component identification information 74). The identification information of the components includes the description 601 of a model name, the description 602 of an arrangement position on the system configuration diagram, and the description 603 of identification information of a component at a connection destination.

Figure 24:
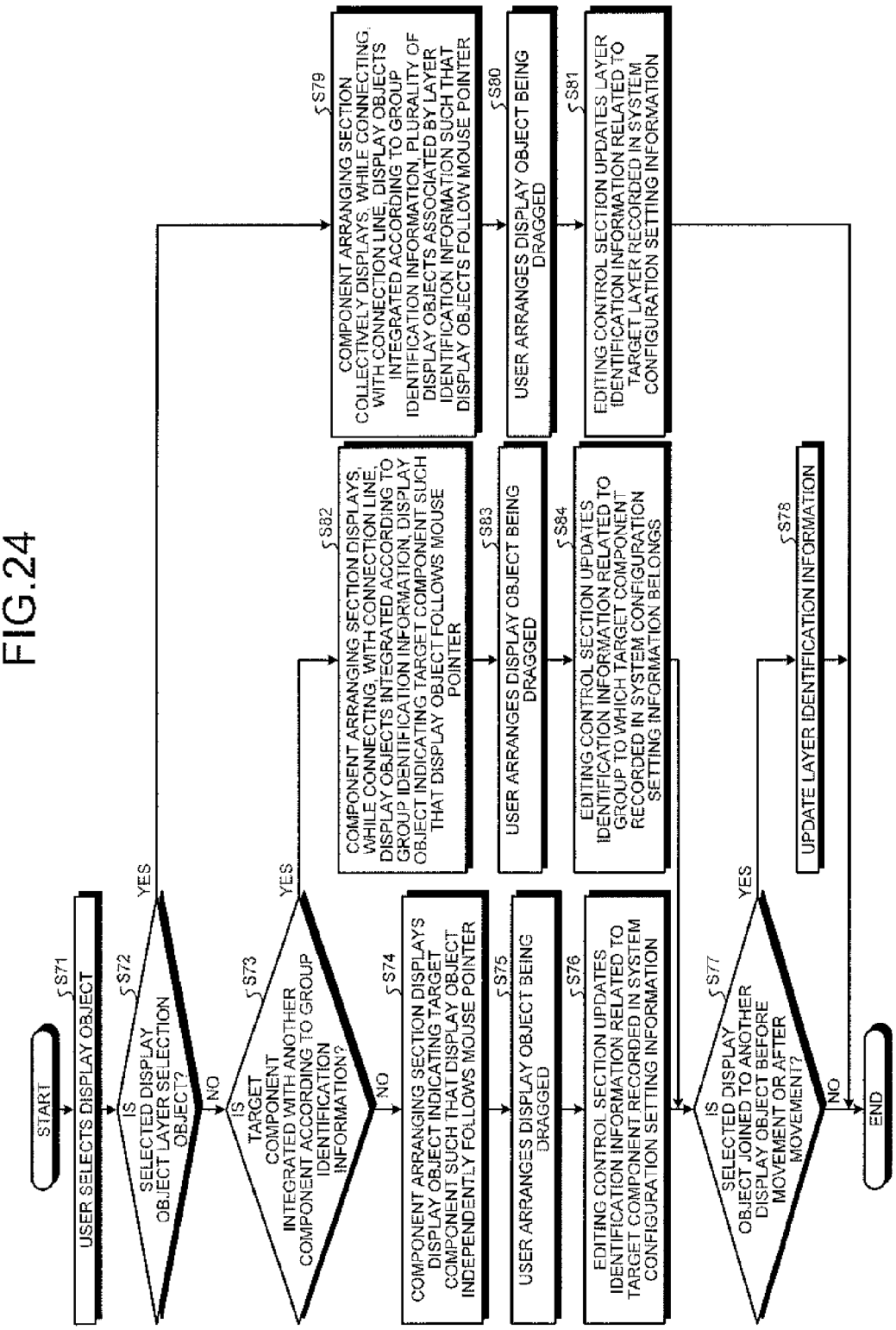
FIG. 24 is a flowchart for explaining the operation of the system construction supporting apparatus in the fourth embodiment performed when a user moves a component displayed on a system configuration diagram.

FIG. 24 is a flowchart for explaining the operation of the system construction supporting apparatus in the fourth embodiment performed when the user moves a component displayed on the system configuration diagram.

First, the user selects a display object (step S71). Then, the component arranging section 27 determines whether the selected display object is the layer selection object 39 (step S72). When the selected display object is not the layer selection object 39 (No at step S72), the component arranging section 27 determines whether a selected target component is integrated with another component according to group identification information (step S73). When the target component is not integrated with another component (No at step S73), at steps S74 to S76, kinds of processing respectively same as steps S23 to S25 are executed.

The component arranging section 27 determines whether the display object related to the target component is arranged to be joined to a display object related to the other component before the movement or after the movement (step S77). When the display object related to the target component is adjacent to the display object related to the other component before the movement or after the movement (Yes at step S77), the editing control section 21 updates layer identification information related to a layer including the other component (step S78).

When the display object related to the target component is arranged to be joined to the display object related to the other component before the movement, this means that the target component and the other component are associated by layer identification information related to the same layer. In this case, the editing control section 21 deletes identification information related to the target component from the layer identification information in the processing at step S78. When the display object related to the target component is arranged to be joined to the display object related to the other component after the movement, this corresponds to the fact that the display object of the target component is moved such that the target component and the other component are adjacent to each other. In this case, in the processing at step S78, the editing control section 21 adds the identification information related to the target component to layer identification information related to a layer to which the other component belongs. When the other component belongs to no layer, the editing control section 21 generates layer identification information anew and describes identification information of the target component and the other component in the generated layer identification information.

After the processing at step S78, the operation ends. When the display object related to the target component is not arranged to be joined to the display object related to the other component both before the movement and after the movement (No at step S77), the processing at step S78 is skipped.

When the selected display object is the layer selection object 39 (Yes at step S72), the component arranging section 27 collectively displays respective display objects related to a plurality of components designated by the selected layer selection object 39 such that the display objects follow a mouse pointer (step S79). At this point, the component arranging section 27 deforms a connection line connecting display objects integrated according to identification information related to a group while maintaining the connection line. That is, when a connection line connecting a layer to be moved and another layer is present, the connection line is deformed according to the movement of the layer to be moved. The user drops the display object being dropped (the layer selection objet 39) on the configuration diagram editing screen 31 (step S80). Then, the editing control section 21 updates the identification information related to a group that associates a branching unit and an extension unit and the layer identification information related to the layer designated by the moved layer selection object, which are recorded in the system configuration setting information 60 (step S81), and the operation ends. At step S81, the description 602 of an arrangement position included in respective kinds of identification information on the system configuration diagram is updated.

When the selected target component is integrated with another component (Yes at step S73), i.e., the target component is an inter-layer connection component, the component arranging section 27 displays, while deforming a connection line connecting the target component and the other component integrated with the target component while maintaining a connection relation, the display object indicating the target component such that the display object independently follows a mouse pointer (step S82). The user drops, on the configuration diagram editing screen 31, the display object being dragged (step S83). Then, the editing control section 21 updates identification information related to the target group recorded in the system configuration setting information 60 (step S84). The processing at step S77 is executed.

As explained above, according to the fourth embodiment, the component arranging section 27 is configured to display the layer selection object 39 for collectively selecting a plurality of components belonging to the same layer on the system configuration diagram 31 for each of layers and collectively move, when receiving an input for moving the layer selection object 39, a plurality of components belonging to a layer corresponding to the designated layer selection object 39 while deforming a connection line connecting the layer corresponding to the designated layer selection object 39 and another layer. Therefore, because the components belonging to the same layer are simultaneously moved while a connection relation between the layers is maintained, a workload on the user is reduced compared with a workload imposed on the user when the respective components are separately moved and deleted.

In the fourth embodiment, an operation performed when a branching unit or an extension unit is deleted is not explained. However, when the branching unit or the extension unit is deleted, the component arranging section 27 can delete a display object related to a component of the same layer as the deleted branching unit or extension unit and delete a display object related to a branching unit or an extension unit belonging to another layer associated with the branching unit or the extension unit belonging to the layer according to identification information related to a group.

Figure 25:
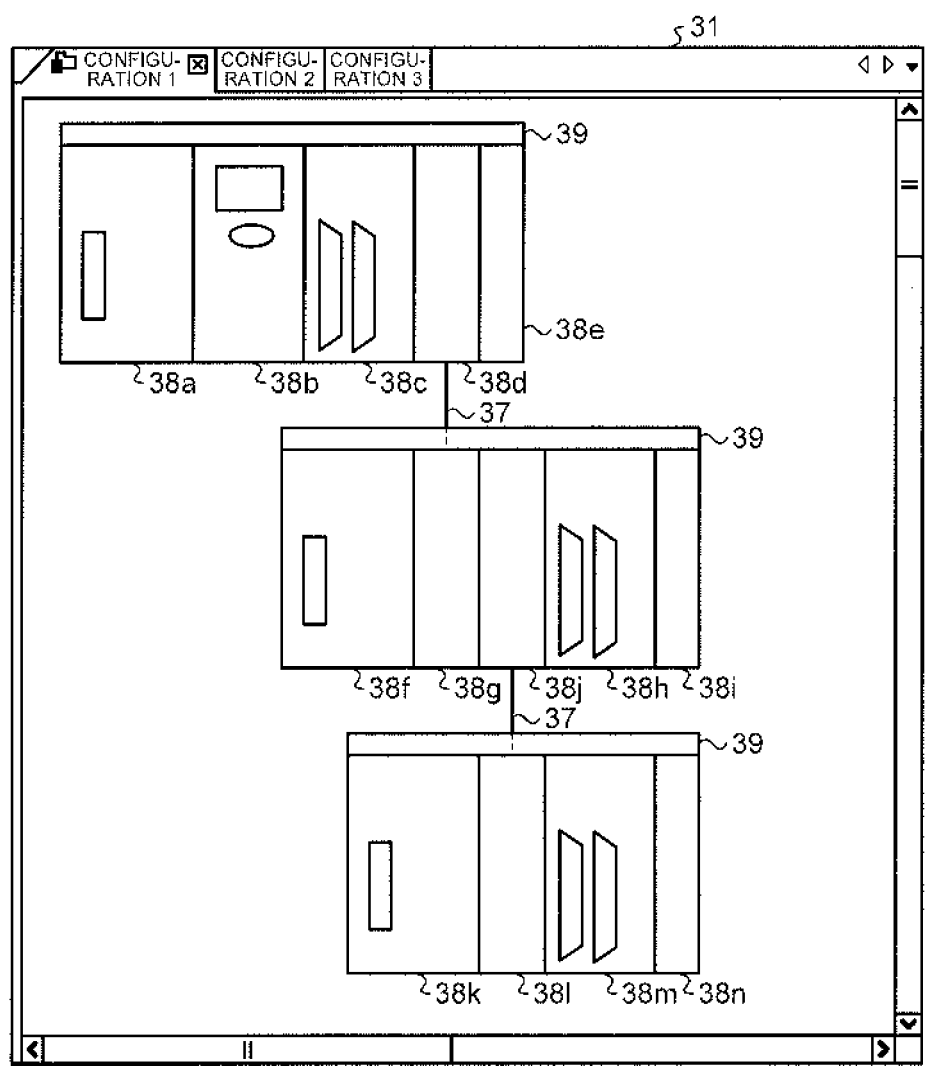
FIG. 25 is a diagram for specifically explaining the operation of the system construction supporting apparatus in the fourth embodiment performed when operation for deleting an extension unit is performed.
Figure 26:
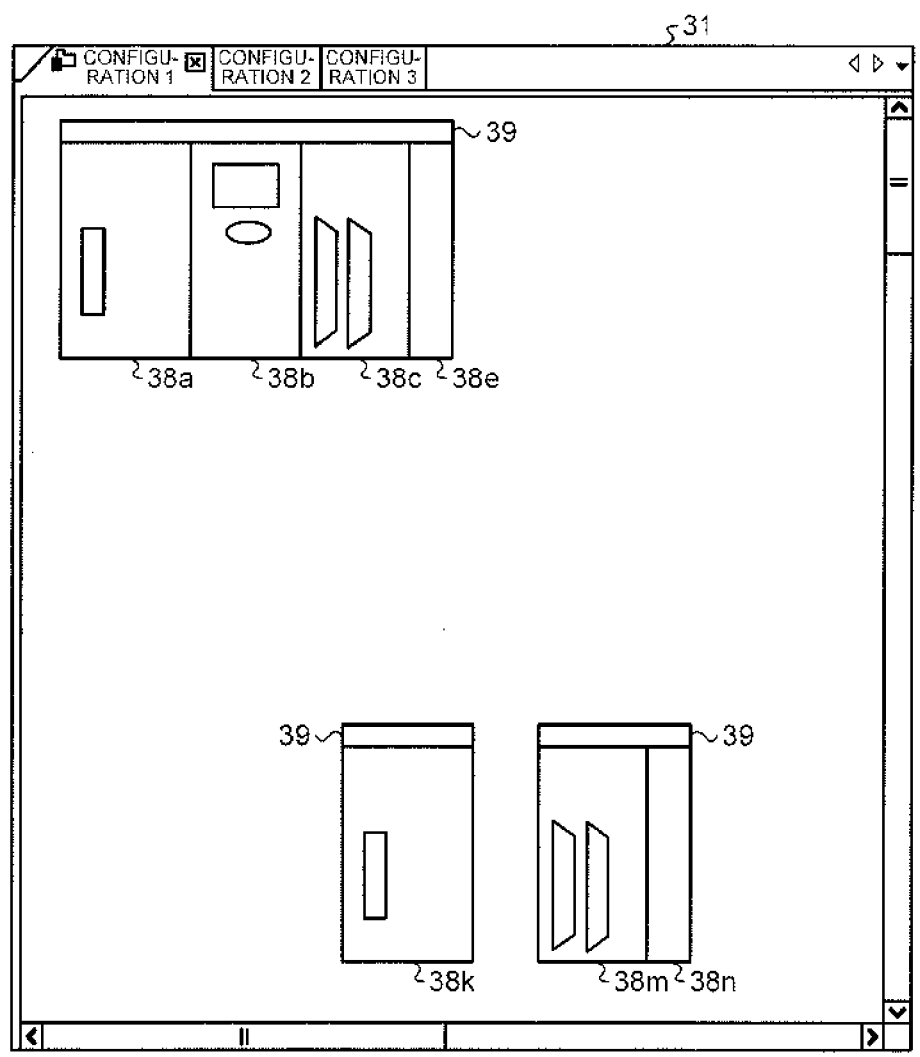
FIG. 26 is a diagram for specifically explaining the operation of the system construction supporting apparatus in the fourth embodiment performed when the operation for deleting an extension unit is performed.

FIGS. 25 and 26 are diagrams for specifically explaining the operation of the system construction supporting apparatus in the fourth embodiment performed when operation for deleting an extension unit is performed. Specifically, FIG. 25 shows a state of the configuration diagram editing screen 31 on which the display objects 38a to 38e respectively indicating a power supply unit, a CPU unit, a positioning unit, a branching unit, and an end cover included in a PLC of a first layer, display objects 38f to 38j respectively indicating a power supply unit, an extension unit, a positioning unit, an end cover, and a branching unit included in a PLC of a second layer, and display objects 38k to 38n respectively indicating a power supply unit, an extension unit, a positioning unit, and an end cover included in a PLC of a third layer are displayed.

FIG. 26 shows a state of the configuration diagram editing screen 31 after the user performs operation for selecting the display object 38g indicating the extension unit on the configuration diagram editing screen 31 shown in FIG. 25 and deleting the display object 38g. As shown in the figure, when compared with the state shown in FIG. 25, not only the display object 38g but also the display objects 38f and 38h to 38j related to components belonging to the same layer as the extension unit indicated by the display object 38g are deleted. The branching unit 38d integrated with the extension unit indicated by the display object 38g is deleted. Further, the display object 38i indicating the extension unit integrated with the dividing unit indicated by the display object 38j belonging to the same layer as the extension unit indicated by the display object 38g is deleted.

After the display object 38d indicating the branching unit is deleted, the display object 38e belonging to the same layer as the branching unit is automatically updated in arrangement and is connected to the display object 38c indicating the positioning unit and displayed. That is, when the display object 38d is deleted, the two display objects 38c and 38e located on both sides of the display object 38d are changed in arrangement to be connected to each other. On the other hand, after the display object 38i indicating the extension unit is deleted, the two display objects 38k and 38m located on both sides of the display object 38i are not rearranged. The rearrangement is performed when units related to respective display objects are connectable to each other and is not performed when the units related to the respective display objects are not connectable to each other. Determination concerning whether two units are connectable to each other can be performed in any way. For example, combinations of connectable units can be registered in the ROM 12 in advance. The component arranging section 27 can determine, based on the registered information, whether the two units are connectable.

INDUSTRIAL APPLICABILITY

As explained above, the system construction supporting apparatus and the system configuration diagram creating method according to the present invention are suitably applied to a system construction supporting apparatus and a system configuration diagram creating method for supporting construction of an FA system.

REFERENCE SIGNS LIST 10, 70 System construction supporting apparatuses
11 CPU
12 ROM
13 RAM
14 Display device
15 Input device
16 System construction supporting program
21 Editing control section
22 Component-list generating section
23 Component-information storing section
24 Association-information storing section
25 Component searching section
26 Component-candidate selecting section
27 Component arranging section
28 Configuration storing section
30 Display screen
31 Configuration diagram editing screen
32 Component list display screen
33, 35, 35a to 35c Display objects
33a to 33h Slot indications
34 Tab
36 Mouse pointer
37 Connection line
38a to 38h Display objects
39 Layer selection object
40 Component information
50 Association information
51 to 53 Fields
60 System configuration setting information
61 First group identification information
62 Second group identification information
63 First component identification information
64 Second component identification information
65 Third component identification information
66 Fourth component identification information
67 Fifth component identification information
68 First layer identification information
69 Second layer identification information
71 Part-of-components changing section
72 Sixth component identification information
73 Seventh component identification information
74 Eighth component identification information
80 Input screen
81 Display screen 91 Layer
92 Layer
93 Layer
91a to 91e, 92a to 92e, 93a to 93d Units
601 to 603 Descriptions

The invention claimed is:

1. A system construction supporting apparatus that creates a system configuration diagram constructed by connecting a plurality of display objects corresponding to components of an FA system, the system construction supporting apparatus comprising:
 an association-information storing section configured to store in advance association information in which combinations among components connectable to one another are described;
 a component searching section configured to search through, when receiving a first input for designating a component and an arrangement position on the system configuration diagram and arranging a display object of the component anew on the system configuration diagram, the association information and extract another component connectable to the component; and
 a component arranging section configured to connect, with a connection line, the display object corresponding to the component and a display object of the extracted other component and arrange the display objects in designated arrangement position on the system configuration diagram, wherein
 the component arranging section independently moves, when receiving a second input for moving one of a plurality of display objects connected to one another and arranged on the system configuration diagram, the display object designated by the second input while deforming the connection line connecting the display object designated by the second input and the connected other display object to maintain a connection relation between the designated display object and the other display object.

2. The system construction supporting apparatus according to claim 1, further comprising:
 a configuration storing section configured to store group identification information in which association among a plurality of components, display objects of which are connected to one another by connection lines, is described for each of the components; and
 an editing control section configured to sequentially reflect editing content on the group identification information every time the system configuration diagram is edited by the component arranging section, wherein
 the component arranging section specifies, when receiving the second input, by referring to the group identification information stored in the configuration storing section, a display object connected by the connection line to the display object designated by the second input.

3. The system construction supporting apparatus according to claim 1, wherein the component arranging section searches through, when receiving a third input for changing one of a plurality of display objects connected to one another by the connection lines and arranged on the system configuration diagram, the association information and extracts components connectable to a component corresponding to a display object connected to the display object designated by the third input and replaces, when further receiving a fourth input for designating a component anew from the extracted components, the display object designated by the third input with a display object corresponding to the component designated by the fourth input.

4. The system construction supporting apparatus according to claim 3, further comprising:
 a configuration storing section configured to store group identification information in which association among a plurality of components, display objects of which are connected to one another by connection lines, is described for each of groups; and
 an editing control section configured to sequentially reflect editing content on the group identification information every time the system configuration diagram is edited by the component arranging section, wherein
 the component arranging section specifies, when receiving the third input, by referring to the group identification information stored in the configuration storing section, a display object belonging to a same group as the display object designated by the third input.

5. The system construction supporting apparatus according to claim 3, wherein
 the component arranging section displays, as a list, in order based on model names, components connectable to a component corresponding to another display object connected by the connection line to the display object designated by the third input, and
 the fourth input is an input for designating a component from the components displayed as the list.

6. The system construction supporting apparatus according to claim 3, further comprising a component-information storing section configured to store in advance component information in which specifications of components are described for each of the components, wherein
 the component arranging section extracts, when receiving the third input, by referring to the component information, components satisfying specific conditions related to the specifications from components connectable to a component corresponding to another display object connected by the connection line to the display object designated by the third input and displays the components as a list, and
 the fourth input is an input for designating a component from the components displayed as the list.

7. The system construction supporting apparatus according to claim 6, wherein the component arranging section receives an input of conditions related to the specifications.

8. The system construction supporting apparatus according to claim 1, wherein the component searching section searches through the association information, determines whether a plurality of combinations among components including the designated component are present, and urges, when a plurality of combinations are present, a user to perform an input for narrowing down the combinations to one.

9. The system construction supporting apparatus according to claim 1, where the component arranging section collectively moves, when receiving a fifth input for moving a connection line connecting a plurality of display objects, together with the connection line, the display objects connected by the connection line designated by the fifth input.

10. The system construction supporting apparatus according to claim 1, wherein
 the system configuration diagram is a configuration diagram of a system in which a plurality of layers respectively configured by joining a plurality of components including an inter-layer connection component are connected to one another via the inter-layer connection component, and
 the component arranging section displays, for each of the layers, on the system configuration diagram, a layer selection object for collectively selecting a plurality of components belonging to a same layer and collectively moves, when receiving a sixth input for moving the layer selection object, a plurality of components belonging to a layer corresponding to the layer selection object designated by the sixth input while deforming a connection line connecting the layer corresponding to the layer selection object designated by the sixth input and another layer.

11. A system configuration diagram creating method for creating a system configuration diagram constructed by connecting a plurality of display objects corresponding to components of an FA system, the system configuration diagram creating method comprising:

a first input step of receiving a first input for designating a component and an arrangement position on the system configuration diagram and arranging a display object of the component on the system configuration diagram;

a searching step of searching through association information in which combinations among components connectable to one another are described and extracting another component connectable to the designated component;

an integrally arranging step of connecting, with a connection line, the display object of the component and a display object of the extracted other component and arranging the display objects in designated arrangement positions on the system configuration diagram;

a second input step of receiving a second input for moving or deleting one of the integrated display objects; and an operation step of independently moving, when receiving a second input for moving one of a plurality of display objects connected to one another and arranged on the system configuration diagram, the display object designated by the second input while deforming a connection line connecting the display object designated by the second input and another display object connected to the display object to maintain a connection relation between the designated display object and the other display object.

\* \* \* \* \*